United States Patent
Li et al.

(10) Patent No.: US 10,827,170 B2
(45) Date of Patent: Nov. 3, 2020

(54) METHOD AND DEVICE FOR CODING POC, METHOD AND DEVICE FOR DECODING POC, AND ELECTRONIC EQUIPMENT

(71) Applicant: ZTE Corporation, Shenzhen (CN)

(72) Inventors: Ming Li, Shenzhen (CN); Ping Wu, Shenzhen (CN); Guoqiang Shang, Shenzhen (CN); Yutang Xie, Shenzhen (CN)

(73) Assignee: ZTE Corporation, Shenzhen (CN)

(*) Notice: Subject to any disclaimer, the term of this patent is extended or adjusted under 35 U.S.C. 154(b) by 0 days.

(21) Appl. No.: 16/518,183

(22) Filed: Jul. 22, 2019

(65) Prior Publication Data

US 2019/0349579 A1    Nov. 14, 2019

Related U.S. Application Data

(63) Continuation of application No. 15/107,585, filed as application No. PCT/CN2014/089231 on Oct. 23, 2014, now Pat. No. 10,362,304.

(30) Foreign Application Priority Data

Dec. 26, 2013    (CN) .......................... 2013 1 0733011

(51) Int. Cl.
   *H04N 19/105*    (2014.01)
   *H04N 19/184*    (2014.01)
   (Continued)

(52) U.S. Cl.
   CPC ......... *H04N 19/105* (2014.11); *H04N 19/184* (2014.11); *H04N 19/187* (2014.11);
   (Continued)

(58) Field of Classification Search
   None
   See application file for complete search history.

(56) References Cited

U.S. PATENT DOCUMENTS

| | | | |
|---|---|---|---|
| 6,897,793 B1* | 5/2005 | Kim ...................... | H03M 5/145 341/50 |
| 2013/0077680 A1* | 3/2013 | Wang ................... | H04N 19/105 375/240.12 |

(Continued)

FOREIGN PATENT DOCUMENTS

| | | |
|---|---|---|
| CN | 103379320 | 10/2013 |
| WO | 2013044075 | 3/2013 |
| WO | 2013048311 | 4/2013 |

OTHER PUBLICATIONS

Byeongdoo Choi et al.: "3d-HEVC HLS: On Picture Order Counts" 100. Mpeg Meeting; (Motion Picture Expert Group or ISO/IEC JTC1/SC29/WG11), No. M24874, Retrieved Apr. 27, 2012; XP030053217.

(Continued)

*Primary Examiner* — Christopher Braniff
(74) *Attorney, Agent, or Firm* — Perkins Coie LLP

(57) ABSTRACT

Provided are a method and a device for decoding a Picture Order Count (POC), and a method and a device for coding a POC, and electronic equipment. The method for decoding the POC includes that: parameters for Most Significant Bit (MSB) and Least Significant Bit (LSB) used in an alignment operation on the POC are acquired; an MSB value and an LSB value of a POC value of a current picture are determined according to the parameters for MSB and LSB; and the POC value of the current picture is calculated according to the MSB value and the LSB value. By means of the technical solution, the problems in the related art that the accuracy in decoding and outputting a multilayer video bitstream cannot be ensured and an extra overhead of network resources is increased in multilayer video coding and decoding processes are solved.

14 Claims, 9 Drawing Sheets

US 10,827,170 B2
Page 2

(51) Int. Cl.
  *H04N 19/187* (2014.01)
  *H04N 19/30* (2014.01)
  *H04N 19/597* (2014.01)
  *H04N 19/70* (2014.01)
  *H04N 19/463* (2014.01)
  *H04N 19/433* (2014.01)

(52) U.S. Cl.
  CPC .......... *H04N 19/30* (2014.11); *H04N 19/433* (2014.11); *H04N 19/463* (2014.11); *H04N 19/597* (2014.11); *H04N 19/70* (2014.11)

(56) References Cited

U.S. PATENT DOCUMENTS

| | | |
|---|---|---|
| 2013/0188709 A1 | 7/2013 | Deshpande et al. |
| 2013/0208792 A1 | 8/2013 | He et al. |
| 2014/0301439 A1* | 10/2014 | Chen .................. H04N 19/68 375/240.02 |

OTHER PUBLICATIONS

Chen J. et al.: "Shvc Draft 4" 15. JCT-VC Meeting; (Joint Collaborative Team on Video Coding of ISO/IED JTC1/SC29/WG11 and ITU-T Sg.16; url: http://wftp3.itu.int/av-arch/jctvc-Site/, No. JCTV-01008, Retlieved Nov. 14, 2013; XP030115462.
Flynn D. et al.: "HEVC Range Extensions Draft 5" 15. JCT-VC Meeting; (Joint Collaborative Team on Video Coding of ISO/IEC JTC1/SC29,WG11 and ITU-T Sg.16; url: http://wftp3.itu.int/av-arch/jctvc-Site/, No. JCTVC-01005, Retrieved Nov. 19, 2013; XP030115459.
Lim et al.: "MV-HEVC/SHVC HLS: Comments on POC Alignment" 16. JCT-VC Meeting; (Joint Collaborative Team on Video Coding of ISO/IEC JTC1/SC29/WG11 and ITU-T Sg.16; url: http://wftp3.itu.int/av-arch/jctvc-site/, No. JCTVC-P0067, Retrieved Jan. 3, 2014; XP030115536.
Ramasubbramonian A Ak et al.: "MV-HEVC/SHVC HLS: On Picture Order Count" 15. JCT-VC Meeting; (Joint Collaborative Team on Video Coding of ISO/IEC JTC1/SC29/WG11 and ITU-T SG.16; url: http://wftp3.itu.int/av-arch/jctvc-site/, No. JCTVC-00176-V3, Retrieved Oct. 15, 2013; XP030115261.
Sjoberg R et al.: "HLS: Error Robust POC Alignment" 15. JCT-VC Meeting; (Joint Collaborative Team on Video Coding of ISO/IEC JTC1/SC29/WG11 and ITU-T SG.16; url: http://wftp3.itu.int/av-arch/jctvc-site/, No. JCTVC-00176-V3, Retrieved Oct. 28, 2013; XP030115209.
Supplementary European Search Report Application No. EP14875285, dated Dec. 2, 2016; pp. 12.
International Search Report for corresponding application PCT/CN2014/089231 filed on Oct. 23, 2014; dated Jan. 28, 2015.
IP Office China PRC, First Office Action Application No. 201310733011.6, dated Feb. 2, 2018.
IP Office China PRC, Second Office Action Application No. 201310733011.6, dated Sep. 5, 2018.
European Patent Office, Exam Report Application No. EP14875285, dated Jun. 30, 2020.
IP Office Japan, First Office Action Application No. 2016-542905, dated Jun. 26, 2018.
IP Office Japan, Second Office Action Application No. 2016-542905, dated Oct. 25, 2018.
Bross B et al: "High Efficiency Video Coding (HEVC) text specification draft 6", 8. JCT-VC Meeting; 20120201-2012021 O; San Jose; (Joint Collaborative Team on Video Coding of ISO/IEC JTC1/SC29/WG11 and ITU-T SG.16 ), No. JCTVC-H1003 Apr. 2, 2012 (Apr. 2, 2012), XP030233254, Retrieved from the Internet: URL:http://phenix.int-evry.fr/jct/ doc_end_user/documents/8_San%20Jose/wg 11/JCTVC-H1003-v22.zip JCTVC-H1003_dK.doc [D16 of Jun. 30, 2020 European Exam Report].
Chen Y et al., "MV-HEVC/SHVC HLS: Cross-layer POC alignment," Joint Collaborative Team onVideo Coding (JCT-VC) of ITU-T SG 16 WP 3 and ISO/IEC JTC 1/SC 29/WG 11 and 14th Meeting: Vienna, AT, Jul. 2013, and JCTVC-N0244 and pp. 1-4 [cited in Jun. 26, 2018 1st Japanese Office Action].
Choi B et al: "POC signalling for CRA picture", 9. JCT-VC Meeting; 100. MPEG Meeting; Apr. 27, 2012-Jul. 5, 2012; Geneva; (Joint Collaborative Team on Video Coding of ISO/IEC JTC1/SC29/ WG11 and ITU-T SG.16); URL: http://WFTP3.ITU.INT/AV-ARCH/JCTVC-SITE/, No. JCTVC-I0133, Apr. 16, 2012 (Apr. 16, 2012), XP030111896 [D15 of Jun. 30, 2020 European Exam Report].
Choi B et al: "MV-HEVC/SHVC HLS: Alignment of picture order counts", 15. JCT-VC Meeting; Oct. 23, 2013-Jan. 11, 2013; Geneva; (Joint Collaborative Team on Video Coding of ISO/IEC JTC1/SC29/ WG11 and ITU-T SG.16 ); URL: http://WFTP3.ITU.INT/AV-ARCH/JCTVC-SITE/, No. JCTVC-O0140, Oct. 15, 2013 (Oct. 15, 2013), XP030115154 [D17 of Jun. 30, 2020 European Exam Report].
Deshpande et al, "On POC Alignment," Joint Collaborative Team on Video Coding (JCT-VC) of ITU-T SG 16 WP 3 and ISO/IEC JTC 1/SC 29/WG 11, 15th Meeting, Document: Document: JCTVC-O0117; Oct. 24, 2013 [D2 of Sep. 5, 2018 2nd Chinese Office Action].
Hendry (Qualcomm) et al., "MV-HEVC/SHVC HLS: On picture order count", (Joint Collaborative Team on Video Coding of ISO/IEC JTC1/SC29/WG11 and ITU-T SG.16), No. JCTVC-P0041 Jan. 9-17, 2014; URL: http://phenix.int-evry.fr/jct/doc_end_user/documents/16_San%20Jose/wg11/JCTVC-P0041-v5.zip JCTVC-P0041 v5_JCT3V-G0031 v5.doc [D13 of Jun. 30, 2020 European Exam Report].
Hendry (Qualcomm) et al: "MV-HEVC/SHVC HLS: On picture order count", (Joint Collaborative Team on Video Coding of ISO/IEC JTC1/SC29/WG11 and ITU-T SG.16), No. JCTVC-P0041 20 Jan. 9-17, 2014, XP030238967, URL:http://phenix.int-evry.fr/jct/doc_end_user/documents/16_San%20Jose/wg11/JCTVC-P0041-v5.zip JCTVC-P0041 v4_JCT3VG0031 v4_attachment.doc [D14 of Jun. 30, 2020 European Exam Report].

* cited by examiner

_METHOD AND DEVICE FOR CODING POC, METHOD AND DEVICE FOR DECODING POC, AND ELECTRONIC EQUIPMENT_

CROSS REFERENCE TO RELATED APPLICATIONS

This patent document is a continuation application of U.S. patent application Ser. No. 15/107,585, filed on Sep. 28, 2016, which is a national stage application under 35 U.S.C. § 371 of International Patent Application No. PCT/CN2014/089231, filed on Oct. 23, 2014, which claims the benefit of priority under the Paris Convention of Chinese Patent Application No. 201310733011.6, filed on Dec. 26, 2013. The entire contents of the before-mentioned patent applications are incorporated by reference as part of the disclosure of this application.

TECHNICAL FIELD

The present disclosure relates to the field of communications, and in particular to a method and device for coding Picture Order Count (POC), a method and device for decoding POC, and electronic equipment.

BACKGROUND

In the ongoing standardization tracks based on H.265/High Efficiency Video Coding (HEVC) while providing backward compatibility, i.e. scalable video coding and a Three-Dimensional Video (3DV) coding including MV-HEVC (HEVC multi-view video coding extension framework) and 3D-HEVC (3D High Efficiency Video Coding), a unified common high-level structural design is adopted. The unified structural design is based on a multi-layer video coding, which introduces a concept of "layer" to represent texture components and depth components of the MV-HEVC and the 3D-HEVC and different scalable layers of the scalable video coding, and to indicate different views and scalable layers by means of layer identifiers (Layer Ids). A currently issued H.265/HEVC standard is referred to as H.265/HEVC Version 1 standard.

In multi-layer video coding, video pictures obtained at the same time instant and corresponding coding bits constitute an Access Unit (AU). In the same AU, each layer of pictures may use different coding methods. In such a way, in the same AU, a certain layer of pictures may be an Intra Random Access Point (IRAP) picture servable as a random point, and one or more of pictures on other layers are common inter-frame and inter-layer predicted coding pictures. In practical application, different layers may select respective IRAP picture insertion policies according to a network transmission situation, a video content changing and the like. For example, a shorter IRAP picture insertion period may be adopted for video pictures on a Base Layer (BL) compatible with H.265/HEVC, and a relatively longer IRAP picture insertion period may be adopted for a video picture on an Enhancement Layer (EL). In such a way, by means of a layer-wise accessed multi-layer video coding structure, random access performance of a multi-layer video coding bitstream may be ensured without sharp increment in coding bit-rate.

A BL bitstream in the multi-layer video coding bitstream should be compatible with the H.265/HEVC Version 1 standard. That is, the multi-layer video coding bitstream should ensure that a decoder designed according to the H.265/HEVC Version 1 standard can correctly decode the BL bitstream extracted from the multi-layer video coding bitstream. Specifically, for the MV-HEVC and the 3D-HEVC, the BL corresponds to a base view or an independent view, and the EL corresponds to an enhancement view or a dependent view. In practical application, a base view bitstream only used for being played by a traditional two-dimensional television, a dual-view bitstream supporting three-dimensional display and a multi-view bitstream for three-dimensional display may be obtained by means of a method for extracting the multi-layer video coding bitstream.

In the H.265/HEVC Version 1 standard, there are three types of IRAP pictures, namely an Instantaneous Decoding Refresh (IDR) picture, a Broken Link Access (BLA) picture and a Clean Random Access (CRA) picture. The three pictures are coded in an intra coding mode and decoded without depending on other pictures. The three picture types are different in operations on Picture Order Count (POC) and Decoded Picture Buffer (DPB).

The POC is an order count configured to identify a picture displaying order in H.265/HEVC Version 1. According to the H.265/HEVC Version 1 standard, a POC value of a picture is composed of two parts. If the POC value of the picture is represented by PicOrderCntVal, PicOrderCntVal=PicOrderCntMsb+PicOrderCntLsb, where PicOrderCntMsb represents a Most Significant Bit (MSB) value of the POC value of the picture, and PicOrderCntLsb represents a Least Significant Bit (LSB) value of the POC value of the picture. Generally, the PicOrderCntMsb value is equal to a PicOrderCntMsb value of a previous picture (TemporalId=0) with respect to a current picture according to a decoding order, and the PicOrderCntLsb value is equal to a value of a slice_pic_order_cnt_lsb field in slice header information. The number of bits for representing slice_pic_order_cnt_lsb field in the bitstream is signalled by log2_max_pic_order_cnt_lsb_minus4 in a Sequence Parameter Set (SPS), and the number of bits for representing slice_pic_order_cnt_lsb in the bitstream is determined as log2_max_pic_order_cnt_lsb_minus4+4.

In the H.265/HEVC Version 1, if a current picture is an IDR picture, a PicOrderCntMsb value is set as 0, slice header information does not contain a slice_pic_order_cnt_lsb field, and a PicOrderCntLsb value defaults to 0. If a current picture is a BLA picture, a PicOrderCntMsb value is set as 0, slice header information contains a slice_pic_order_cnt_lsb field configured to determine a PicOrderCntLsb value. If a current picture is a CRA picture and a flag bit HandleCraAsBlaFlag value is equal to 0, the POC is calculated by means of a general method; and if a current picture is a CRA picture and a flag bit HandleCraAsBlaFlag value is equal to 1, the POC value of the CRA picture is calculated by means of a BLA picture method.

It is important to note that in multi-layer video coding standard, the slice header information of the EL always contains a slice_pic_order_cnt_lsb field regardless of corresponding picture type.

On this basis, for the multi-layer video coding bitstream, in order to ensure that pictures at the same time can be detected in DPB detection process and to make it convenient for a decoder to determine a start/end position of each AU in the bitstream using the POC value, it is required that all pictures in the AUs have the same POC value. For a layer-wise coding structure, each AU probably contains IRAP pictures and non-IRAP pictures at the same time. In such a way, if the IRAP pictures are an IDR picture and a BLA picture, the POC values of the pictures contained in this AU will be different. As a result, it is necessary to design a POC alignment function for the multi-layer video coding standard so as to meet that all pictures in the AUs may have the same POC when using the layer-wise structure.

In order to solve the problem, a POC alignment method is proposed in a JCT-VC standard conference proposal JCTVC-N0244. The method refers to adding a poc_reset_flag field of which the length is 1 bit by using a reserved bit in slice header information. When a value of the field is equal to 1, a POC value of a picture is calculated in accordance with a general method, then a so-called POC shifting operation is performed as subtracting the calculated POC value from the POC values of the pictures in the same layer (including BL) in DPB, and finally the POC value of the picture is set to be 0.

The main defect of the method is that a BL bitstream cannot be compatible with the H.265/HEVC Version 1 standard, that is, it cannot be ensured that the decoder conforming to the H.265/HEVC Version 1 standard can decode the BL bitstream extracted from the multi-layer video coding bitstream.

In order to solve the problem of computability, it was proposed in JCT-VC conference proposals JCTVC-O0140 and JCTVC-O0213 that only an MSB in the POC is set as 0 when it is needed to perform POC alignment on the basis of the JCTVC-N0244. Furthermore, an option of delaying POC alignment is added in the JCTVC-O0213 to deal with application scenario of losing a slice with a flag bit indicating a reset of POC value and application scenario of different frame rates among layers. It was proposed in JCTVC-O0176 that POC alignment is directly performed in the case of an IDR picture without adoption of an explicit signalling by a flag bit in slice header, while adding a reserved bit into slice header of an IDR picture in BL bitstream so as to be configured to calculate a POC value if the picture is a CRA picture rather than an IDR picture. The calculated POC value is configured for performing a POC shifting operation on pictures stored in DPB of ELs. It was proposed in JCTVC-O0275 with a concept of a layer POC, which maintains two sets of different POCs for the pictures on the EL. The layer POC is a POC value obtained under the condition that POC alignment is not performed, and the value of layer POC is configured for relevant operations of a decoding algorithm for Reference Picture Set (RPS) and the like. The other set of POC is the POC subjected to POC alignment. The aligned POC value is consistent with that of a picture on the BL in the same AU, and the aligned POC value is configured to control picture output and displaying processes. According to a method proposed by the proposal JCTVC-O0275, information of the BL is adopted in a POC alignment process, a variable flag maintained inside an encoder/decoder is configured to trigger the POC alignment process, and a value of the flag is associated with picture type information of the BL.

The above method has the defects as follows.

Original POC value of each picture in DPB will be changed due to a POC shifting operation performed on the picture in the POC alignment process of the current picture. Consequently, when a slice containing POC alignment information is lost, POC values of the pictures in the DPB cannot be correctly shifted, which leads to a problem that correct reference pictures cannot be derived for subsequent pictures. Because of wrongly shifted POC values, the pictures which have been already correctly decoded and stored in the DPB will be marked as "wrong decoded pictures".

In the case that frame rates are different among layers, when an AU contains an IDR picture of a BL but does not contain an EL picture, the POC shifting operation will not be executed at this EL in POC alignment process, which leads to a problem that picture outputting process cannot be performed correctly. This problem causes that a delayed POC alignment operation in JCTVC-O0213 cannot ensure correctly decoding and outputting of a multi-layer video coding bitstream.

In the case that layer POC is employed, it is necessary to maintain two sets of different POC systems. However, in these two sets of POC systems, after the POC alignment operation, differences between POCs of any two pictures are equal, that is, redundant information exists in the two sets of POC systems.

In the above methods, both JCTVC-O0140 and JCTVC-O0213 need to use BL reserved bits, and the multi-layer video codec needs to execute different operations from the ones specifies in H.265/HEVC Version 1 standard in processing BL stream according to the value of the reserved bits. Therefore, it blocks a quick and convenient design of re-using an existing product solution conforming to H.265/HEVC Version 1 standard in developing multi-layer video codec implementations. Although bit information is added in slice layer as slice header extension without changing BL decoding process according to a JCTVC-O0176 method, slice layer extension information is byte aligned, which inevitably brings extra bit overheads to a slice header.

In order to correctly execute the POC alignment operation, it is necessary to present quite a number of restrictions on the coding structure in use. For example, JCTVC-O0176 requires that an EL picture must exist in an AU containing an IDR picture in BL. Such restrictions reduce the flexibility of an application employing multi-layer video coding, for example, particularly an uncoordinated simulcast.

An effective solution has not been proposed yet currently for the above problem in the related art.

SUMMARY

The present disclosure provides a POC coding method and device, a POC decoding method and device, and electronic equipment, which are intended to solve, at least, the problems in the related art that the accuracy in decoding and outputting a multilayer video coding bitstream cannot be ensured and an extra overhead of network resources is increased in multilayer video coding and decoding processes.

According to an embodiment of the present disclosure, a method for decoding POC is provided, comprising: acquiring parameters for Most Significant Bit (MSB) and Least Significant Bit (LSB), wherein the parameters for MSB and LSB are used in an alignment operation on the POC; determining an MSB value and an LSB value of a POC value of a current picture according to the parameters for MSB and LSB; and calculating the POC value of the current picture according to the MSB value and the LSB value.

In an example embodiment, determining the MSB value of the POC value of the current picture according to the parameter(s) for MSB comprises one of following: 1, directly acquiring the parameter(s) for MSB carried by a bitstream, and acquiring the MSB value according to the parameter(s) for MSB carried by the bitstream; 2, acquiring first indication information used for indicating an MSB value used by an Enhancement Layer (EL) in a POC alignment process, and deriving the MSB value used by the EL according to the first indication information to obtain the MSB value of the POC value of the current picture; 3, acquiring second indication information set used for indicating an acquiring mode of the parameter(s) for MSB, and determining the MSB value used by an EL according to the second indication information set to obtain the MSB value of the POC value of the current picture.

In an example embodiment, further comprising: determining a reference POC value used in a process of deriving the MSB value of the EL by a following mode: obtaining the reference POC value from available decoding information of a Base Layer (BL) or the EL.

In an example embodiment, deriving the MSB value used by the EL according to the first indication information comprises: extracting the MSB value used by the EL from a reference POC value according to length of bits for representing LSB used by the EL.

In an example embodiment, extracting the MSB value used by the EL from the reference POC value comprises one of following: using an MSB value corresponding to a reference POC value as the MSB value used by the EL; zeroing low bits in a binary representation of a reference POC value, and taking the zeroed reference POC value as the MSB value used by the EL, wherein a number of the zeroed bits is equal to length of bits for representing LSB used by the EL; executing a right shifting operation and then a left shifting operation on the binary representation of a reference POC value, wherein the number of the shifted bits is equal to length of bits for representing LSB used by the EL.

In an example embodiment, acquiring the MSB value according to the parameter(s) for MSB carried by the bitstream comprises one of following: acquiring the MSB value of the POC value of the current picture according to identification information used for identifying that the MSB value is 0; setting the MSB value as the MSB value of the POC value of the current picture; setting a product, obtained by multiplying a value of the parameter(s) for MSB by one of two following values, as the MSB value of the POC value of the current picture, wherein the two values comprise: a minimum allowable positive integer value of the MSB value of the POC value of the current picture; and a value obtained by adding 1 to a maximum allowable value of the LSB value of the POC value of the current picture; executing a left shifting operation on a binary representation of the value of the parameter(s) for MSB, and taking the shifted value of the parameter(s) for MSB as the MSB value of the POC value of the current picture, wherein a number of left-shifted bits is equal to length of bits for representing LSB used by the EL.

In an example embodiment, determining the MSB value used by the EL according to the second indication information set comprises one of following: setting the MSB value used by the EL as 0; using a value obtained by zeroing low bits of a POC value in available decoding information of a BL as the MSB value of the EL, wherein a number of the zeroed low bits is equal to length of bits for representing LSB used by the EL; using a sum of a value obtained by zeroing low bits in a binary representation of a POC value in available decoding information of a BL and a correction value carried in slice header of the EL as the MSB value of the EL, wherein a number of the zeroed low bits is equal to length of bits for representing LSB used by the EL.

In an example embodiment, further comprising: acquiring length of bits for representing the parameter(s) for MSB used for determining the MSB value used by the EL.

In an example embodiment, determining the LSB value of the POC value of the current picture according to the parameter(s) for LSB comprises: directly acquiring the parameter(s) for LSB from the slice header of the EL.

In an example embodiment, calculating the POC value of the current picture according to the MSB value and the LSB value comprises: taking a sum of the MSB value and the LSB value as the POC value of the current picture.

In an example embodiment, before acquiring the parameters for MSB and LSB, wherein the parameters for MSB and LSB are used in an alignment operation on the POC comprises: acquiring a POC alignment operation flag carried in a slice header of an EL, wherein when the POC alignment operation flag indicates that a alignment operation is needed to be executed, acquisition of the parameters for MSB and LSB is triggered.

According to another embodiment of the present disclosure, a method for coding POC is provided, comprising: acquiring a POC value of a current picture, wherein the POC value of the current picture is used in executing a POC alignment operation; mapping a Most Significant Bit (MSB) value and a Least Significant Bit (LSB) value of the POC value to parameters for MSB and LSB used in executing the POC alignment operation; and writing the parameters for MSB and LSB into a bitstream.

In an example embodiment, acquiring the POC value of the current picture, wherein the POC value of the current picture is used in executing the POC alignment operation comprises: setting, when there is a Base Layer (BL) picture located in one Access Unit (AU) together with a current Enhancement Layer (EL) picture, the POC value to be a POC value of the BL picture; otherwise, when there is no the BL picture located in one AU together with the current EL picture, determining, according to frame rate information of a BL and POC information of coded BL picture(s), a POC value which shall be used by a BL picture if the AU contains the BL picture, and taking the POC value which shall be used by the BL picture as the POC value.

In an example embodiment, the MSB value and the LSB value are determined by following methods: taking low bits in a binary representation of the POC value as the LSB value, a number of the used binary low bits being equal to length of bits for representing LSB used by an EL; taking a difference between the POC value and the LSB value as the MSB value; or, zeroing low bits in a binary representation of the POC value, and taking the POC value after zeroing operation as an MSB value used by the EL, a number of the zeroed low bits being equal to length of bits for representing LSB used by an EL; taking a difference between the POC value before the zeroing operation and the MSB value, as the LSB value; or, executing a right shifting operation and then a left shifting operation on a binary representation of the POC value, the number of the left-shifted and the right-shifted bits being equal to length of bits for representing LSB used by the EL; taking the shifted POC value as the MSB value, and taking a difference between the POC value before the shifting operations and the MSB value as the LSB value.

In an example embodiment, mapping the MSB value of the POC value to the parameter(s) for MSB used in executing the POC alignment operation comprises one of the followings: 1, carrying the MSB value in the bitstream as the parameter(s) for MSB; or, 2, mapping the MSB value to first indication information used for indicating an MSB value used by the EL in a POC alignment process; or, 3, mapping the MSB value to second indication information set used for indicating an acquisition mode of the parameter(s) for MSB.

In an example embodiment, carrying the MSB value in the bitstream comprises: directly setting the MSB value to be identification information used for identifying that the MSB value is 0, and carrying the identification information in slice header of an EL picture; directly carrying the MSB value in slice header of an EL picture; setting the MSB value to be a multiple value of one of two following values; and carrying the multiple value in slice header of an EL picture, wherein the two values comprise: a minimum allowable positive integer value of the MSB value of the POC value of the current picture; and a value obtained by adding 1 to a maximum allowable value of the LSB value of the POC value of the current picture; executing a right shifting operation on the binary representation of the MSB value, and carrying the shifted MSB value in slice header of an EL picture, a number of right-shifted bits being equal to length of bits for representing LSB used by the EL.

In an example embodiment, comprising: carrying length of bits for representing the parameter(s) for MSB in the bitstream.

In an example embodiment, the first indication information is determined by following method: selecting a POC value of a decoded picture of the EL, zeroing low bits of a binary representation of the POC value, and taking the POC value, of which the low bits are zeroed, as a first candidate MSB value, a number of the zeroed low bits being equal to length of bits for representing LSB used by the EL; setting, when the first candidate MSB value is equal to the MSB value used by the EL, the first indication information as indication information used for indicating deriving the MSB value used in the POC alignment operation according to EL information; when the first candidate MSB value is not equal to the MSB value used by the EL, selecting a POC value of a decoded picture of the BL, zeroing low bits of a binary representation of the POC value, and taking the POC value, of which the low bits are zeroed, as a second candidate MSB value, wherein a number of the zeroed low bits is equal to length of bits for representing LSB used by the EL; setting, when the second candidate MSB value is equal to the MSB value used by the EL, the first indication information as indication information used for indicating deriving the MSB value used in the POC alignment operation according to BL information; or, setting, when the second candidate MSB value is equal to the MSB value used by the EL, the first indication information as the indication information used for indicating deriving the MSB value used in the POC alignment operation according to the BL information, otherwise, when the first candidate MSB value is equal to the MSB value used by the EL, setting the first indication information as the indication information used for indicating deriving the MSB value used in the POC alignment operation according to the EL information.

In an example embodiment, the first indication information is carried in slice header of the EL picture.

In an example embodiment, when the MSB value is equal to 0, the second indication information set is determined by following manner: setting indication information, used for indicating that the MSB value is zeroed, in the second indication information set, and carrying the indication information in slice header of the EL picture.

In an example embodiment, when the MSB value is not equal to 0, the second indication information set is determined by one of the following manner: setting indication information, used for indicating that the MSB value is not zeroed, in the second indication information set, and carrying the indication information in slice header of an EL picture; selecting a POC value of a decoded picture of the BL, zeroing low bits of a binary representation of the POC value, and taking the POC value as a candidate MSB value, a number of the zeroed low bits being equal to length of bits for representing LSB used by the EL; when the MSB value is equal to the candidate MSB value, setting indication information, used for indicating that the MSB value is directly set to be the candidate MSB value derived according to BL information, in the second indication information set, and carrying the indication information in slice header of an EL picture; otherwise, setting indication information, used for indicating that the MSB value is not directly set to be the candidate MSB value derived according to the BL information, in the second indication information set, calculating a difference between the MSB value and the candidate MSB value, and carrying the indication information and the difference in slice header of the EL picture.

In an example embodiment, the parameter(s) LSB is carried in slice header of an EL picture.

In an example embodiment, before acquiring the POC value of the current picture used in executing the POC alignment operation, further comprising: determining that it is needed to execute the POC alignment operation when satisfying one of following conditions: 1, a BL picture is an Instantaneous Decoding Refresh (IDR) picture, and there is a picture rather than an IDR picture in an EL in an AU where the IDR picture is located; 2, a BL picture is a Broken Link Access (BLA) picture, and there is a picture rather than a BLA picture in an EL in an AU where the BLA picture is located; 3, there is an IDR or BLA BL picture in at least one AU prior to a current AU in decoding order, and there is no an EL picture in the at least one AU; 4, an EL picture is an IDR picture, and there is a picture rather than an IDR picture in an AU where the EL picture is located, or there is not a BL picture in an AU where the EL picture is located; and 5, an EL picture is a BLA picture, and there is a BL picture rather than a BLA picture in an AU where the EL picture is located, or there is not a BL picture in the AU where the EL picture is located.

According to an embodiment of the present disclosure, a device for decoding POC is provided, comprising: an acquiring component, configured to acquire parameters for Most Significant Bit (MSB) and Least Significant Bit (LSB), wherein the parameters for MSB and LSB are used in an alignment operation on the POC; a determining component, configured to determine an MSB value and LSB value of a POC value of a current picture according to the parameters for MSB and LSB; and a calculating component, configured to calculate the POC value of the current picture according to the MSB value and the LSB value.

In an example embodiment, the determining component is configured to determine the MSB value by one of following manners: 1, directly acquiring parameter(s) for MSB carried by a bitstream, and acquiring the MSB value according to the parameter(s) for MSB carried by the bitstream; 2, acquiring first indication information used for indicating an MSB value used by an Enhancement Layer (EL) in a POC alignment process, and deriving the MSB value used by the EL according to the first indication information to obtain the MSB value of the POC value of the current picture; and 3, acquiring second indication information set used for indicating an acquisition mode of the parameter(s) for MSB, and determining the MSB value used by the EL according to the second indication information set to obtain the MSB value of the POC value of the current picture.

According to another embodiment of the present disclosure, a device for coding POC is provided, comprising: an acquiring component, configured to acquire a POC value of a current picture used in executing a POC alignment operation; a mapping component, configured to map a Most Significant Bit (MSB) value and a Least Significant Bit (LSB) value of the POC value to parameters for MSB and LSB used in executing the POC alignment operation; and a writing component, configured to write the parameters for MSB and LSB into a bitstream.

In an example embodiment, the acquiring component is configured to: set, when there is a Base Layer (BL) picture located in one Access Unit (AU) together with a current Enhancement Layer (EL) picture, the POC value to be a POC value of the BL picture; otherwise, when there is no the BL picture located in one AU together with the current EL picture, determine, according to frame rate information of a BL and POC information of coded BL picture(s), a POC value which shall be used by a BL picture if the AU contains the BL picture, and take the POC value which shall be used by the BL picture as the POC value.

According to another embodiment of the present disclosure, electronic equipment is provided, comprising: the above device for decoding POC and/or the above device for coding POC.

In the present disclosure, parameter(s) for MSB parameter and parameter(s) for LSB used in an alignment operation on a POC are acquired according to a result obtained by parsing a multi-layer video coding bitstream, an MSB value and an LSB value of a POC value of a current picture are determined according to the parameters for MSB and LSB and the POC value of the current picture is calculated. The problems in the related art that the accuracy in decoding and outputting the multilayer video coding bitstream cannot be ensured and an extra overhead of network resources is increased in multilayer video coding and decoding processes are solved, thereby achieving the effects that it is unnecessary to add any bit fields to a BL bitstream so as to execute a POC alignment-related operation and it is also unnecessary to execute any POC translation operation on a picture stored in a DPB of a layer.

BRIEF DESCRIPTION OF THE DRAWINGS

The drawings illustrated herein are intended to provide further understanding of the present disclosure, and constitute a part of the present disclosure. The schematic embodiments and illustrations of the present disclosure are intended to explain the present disclosure, and do not form improper limits to the present disclosure. In the drawings.

DETAILED DESCRIPTION OF THE EMBODIMENTS

The present disclosure will be illustrated below with reference to the drawings and the embodiments in detail. It is important to note that the embodiments of the present disclosure and the characteristics in the embodiments can be combined under the condition of no conflicts.

Figure 1:
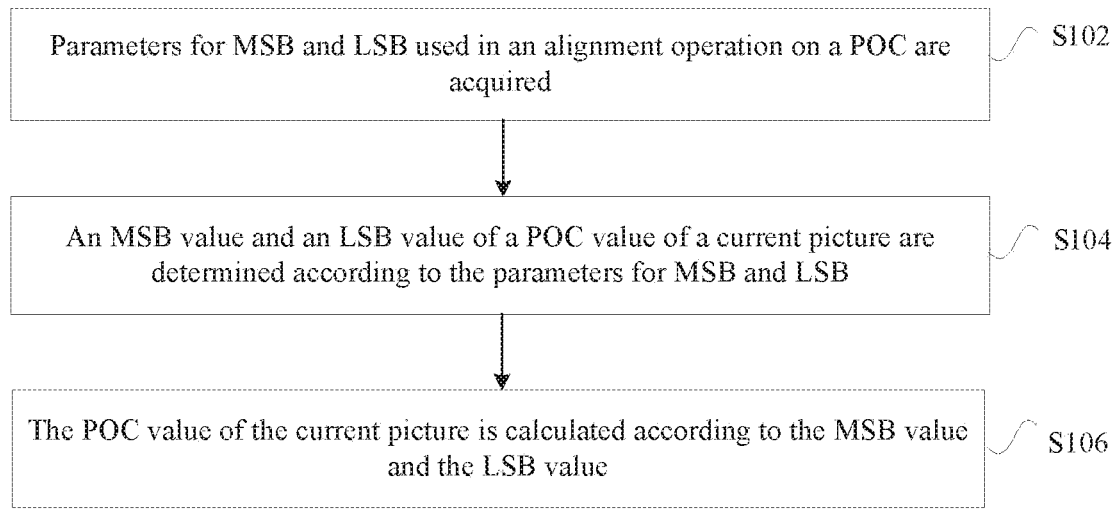
FIG. 1 is a flowchart of a method for decoding a POC according to an embodiment of the present disclosure.

FIG. 1 is a flowchart of a method for decoding a POC according to an embodiment of the present disclosure. As shown in FIG. 1, the method includes Step S102 to Step S106 as follows.

S102: Parameters for MSB and LSB used in an alignment operation on a POC are acquired. When being carried in a received multi-layer video bitstream, the parameters for MSB and LSB may be acquired from slice header of the multi-layer video bitstream, for example, slice header of a bitstream.

S104: An MSB value and an LSB value of a POC value of a current picture are determined according to the parameters for MSB and LSB. It is important to note that specifically speaking, the MSB value and the LSB value may be separately acquired according to the parameters for MSB and LSB, or the MSB value or the LSB value may be determined cooperatively according to the parameters for MSB and LSB.

Wherein, the MSB value may be determined by the following three methods including that:

1, Parameter(s) for MSB carried by a bitstream is directly acquired by parsing the bitstream, and the MSB value is acquired according to the parameter(s) for MSB carried by the bitstream. It is important to note that the bitstream may be a multi-layer video bitstream or a system layer bitstream. Specifically, the MSB value may be acquired by one of the following modes:

the MSB value of the POC value of the current picture is acquired according to identification information used for identifying that the MSB value is 0;

the MSB value of the POC value of the current picture is set to be the value of parameter(s) for MSB;

a product, obtained by multiplying the parameter(s) for MSB by one of the followings: a minimum allowable positive integer value of MSB of the POC value of the current picture; and a value obtained by adding 1 to a maximum allowable value of LSB of the POC value of the current picture, is set to be the MSB value of the POC value of the current picture;

a left shifting operation is executed on a binary representation of the parameter(s) for MSB, and the shifted parameter(s) for MSB is taken as the MSB value of the POC value of the current picture, wherein the number of left-shifted bits is equal to length of bits for representing LSB used by the EL.

2, First indication information used for indicating an MSB value used by an EL in a POC alignment process is acquired, and the MSB value used by the EL is derived according to the first indication information to obtain the MSB value of the POC value of the current picture.

For this method, a reference POC value used in a process of deriving the MSB value of the EL may be determined by the following mode: the reference POC value is obtained from available decoding information of a BL or the EL.

For this method, the MSB value used by the EL may be extracted from the reference POC value according to length of bits for representing LSB used by the EL. Specifically, the MSB value may be acquired by one of the following modes:

an MSB value corresponding to the reference POC value is used as the MSB value used by the EL;

low bits in a binary representation of a reference POC value are zeroed, and the reference POC value after zeroing operation is set to be the MSB value, wherein a number of the zeroed bits in a binary representation of the reference POC value is equal to length of bits for representing LSB used by the EL;

a right shifting operation and then a left shifting operation on the binary representation of the reference POC value are executed, wherein the number of the shifted bits is equal to length of bits for representing LSB used by the EL.

3, Second indication information set used for indicating an acquisition mode of the MSB parameter is acquired, and the MSB value used by the EL is determined according to the second indication information set to obtain the MSB value of the POC value of the current picture, wherein the step that the MSB value used by the EL is determined according to the second indication information set may be implemented by one of the following processes:

the MSB value used by the EL is set to be 0;

a value obtained by setting low bits of a POC value in the available decoding information of the BL is used as the MSB value of the EL, wherein a number of the zeroed low bits is equal to length of bits for representing LSB used by the EL; and a sum of the value obtained by setting the low bits of the POC value in the available decoding information of the BL and a correction value carried by slice header of the EL is used as the MSB value of the EL, wherein the number of the zeroed low bits is equal to length of bits for representing LSB used by the EL.

In this embodiment, length of bits representing the parameter(s) for MSB required for determining the MSB value used by the EL may be acquired. For example, the length is determined by a designated field carried in the bitstream, which may specifically refer to an embodiment 1 and will not be elaborated herein.

S106: The POC value of the current picture is calculated according to the MSB value and the LSB value. For example, a sum of the MSB value and the LSB value may be taken as the POC value of the current picture.

In this embodiment, the parameter(s) for LSB may be directly acquired from the slice header of the EL.

Before S102, a POC alignment operation flag carried in the slice header of the EL may be acquired, wherein when the POC alignment operation flag indicates that it is needed to execute the alignment operation, acquisition of the parameters for MSB and LSB is triggered.

With the above steps, parameters for MSB and LSB used in an alignment operation on a POC are acquired according to a result obtained by parsing a multi-layer video coding bitstream, an MSB value and an LSB value of a POC value of a current picture are determined according to the parameters for MSB and LSB and the POC value of the current picture is calculated, the problems that the accuracy in decoding and outputting the multilayer video coding bitstream cannot be ensured and an extra overhead of network resources is increased in multilayer video coding and decoding processes are solved, thereby achieving the effects that it is unnecessary to add any bit fields to a BL bitstream so as to execute a POC alignment-related operation and it is also unnecessary to execute any POC translation operation on a picture stored in a DPB of a layer.

Figure 2:
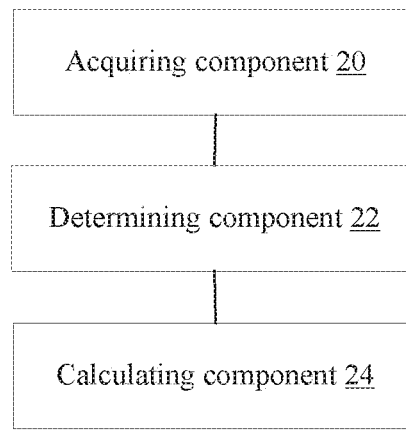
FIG. 2 is a structure block diagram of a device for decoding a POC according to an embodiment of the present disclosure.

In an embodiment of the present disclosure, a device for decoding a POC is also provided. The device is configured to implement the above embodiment and an example implementation. Those which have been illustrated will not be elaborated herein. Components involved in the device are illustrated below. Just as a term 'component' used below, the combination of software and/or hardware with predetermined functions may be implemented. Although the device described by the following embodiment is better implemented by software, the implementation of hardware or the combination of software and hardware may be possible and conceived. FIG. 2 is a structure block diagram of a device for decoding a POC according to an embodiment of the present disclosure. As shown in FIG. 2, the device includes:

an acquiring component 20, configured to acquire parameters for MSB and LSB used in an alignment operation on a POC;

a determining component 22, connected to the acquiring component 20, and configured to determine an MSB value and an LSB value of a POC value of a current picture according to the parameters for MSB and LSB; and a calculating component 24, connected to the determining component 22, and configured to calculate the POC value of the current picture according to the MSB value and the LSB value.

In this embodiment, the determining component 22 is configured to determine the MSB value by one of the following methods: 1, parameter(s) for MSB carried by a bitstream is acquired directly by parsing the bitstream, and the MSB value is acquired according to the parameter(s) for MSB carried by the bitstream; 2, first indication information used for indicating an MSB value used by an EL in a POC alignment process is acquired, and the MSB value used by the EL is derived according to the first indication information to obtain the MSB value of the POC value of the current picture; and 3, second indication information set used for indicating an acquisition mode of the parameter(s) for MSB is acquired, and the MSB value used by the EL is determined according to the second indication information set to obtain the MSB value of the POC value of the current picture.

By means of functions of each of the above components, the problems that the accuracy in decoding and outputting the multilayer video coding bitstream cannot be ensured and an extra overhead of network resources is increased in multilayer video coding and decoding processes may be solved, thereby achieving the effects that it is unnecessary to add any bit fields to a BL bitstream so as to execute a POC alignment-related operation and it is also unnecessary to execute any POC translation operation on a picture stored in a DPB of a layer.

Figure 3:
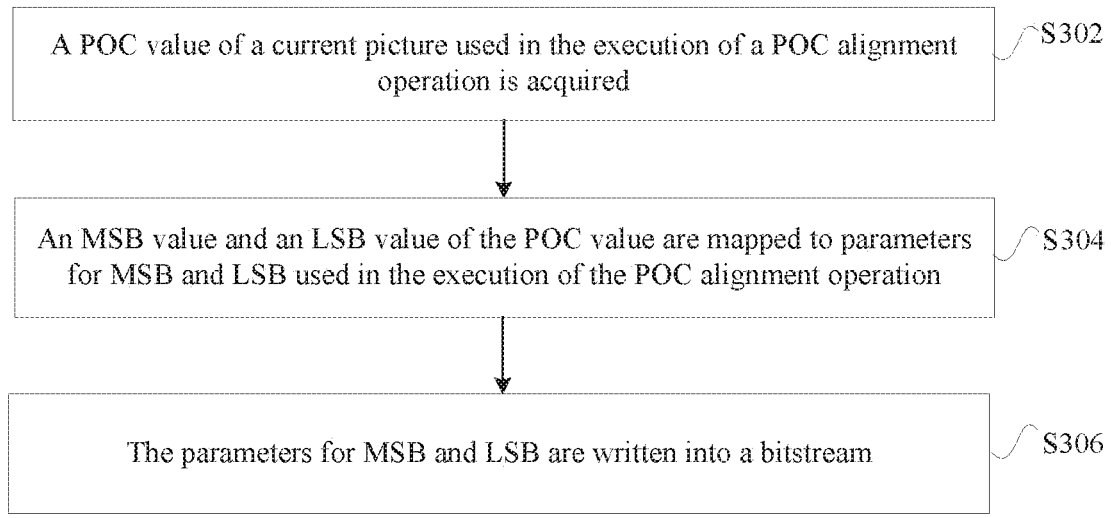
FIG. 3 is a flowchart of a method for coding a POC according to an embodiment of the present disclosure.

According to an embodiment of the present disclosure, a method for coding a POC is further provided. FIG. 3 is a flowchart of a method for coding a POC according to an embodiment of the present disclosure. The method includes Step S302 to Step S306 as follows.

S302: A POC value of a current picture used in executing a POC alignment operation is acquired. Specifically, the step may be implemented by the following processes that:

When there exists a BL picture which is located in the same AU together with a current EL picture, the POC value is set to be a POC value of the BL picture; otherwise, a POC value which shall be used by the BL picture if the AU contains the BL picture is determined according to frame rate information of a BL and POC information of coded BL picture(s), and the POC value which shall be used by the BL picture is taken as the POC value.

S304: An MSB value and an LSB value of the POC value are mapped to parameters for MSB and LSB used in executing the POC alignment operation. The LSB parameter may be carried in slice header of the EL picture.

The MSB value and the LSB value may be determined by the following methods:

low bits in a binary representation of the POC value are taken as the LSB value, wherein a number of the used low bits is equal to length of bits for representing LSB used by an EL; a difference between the POC value and the LSB value is taken as the MSB value; or, low bits in a binary representation of the POC value are zeroed, and the POC value after zeroing operation is set to be an MSB value used by the EL, wherein a number of the zeroed low bits is equal to length of bits for representing LSB used by the EL; a difference between the POC value before zero operation and the MSB value is taken as the LSB value; or, a right shifting operation and then a left shifting operation are executed on the binary representation of the POC value, wherein number of left-shifted bits and right-shifted bits is equal to length of bits for representing LSB used by the EL, the shifted POC value is taken as the MSB value, and a difference between the POC value before shifting operation and the MSB value is taken as the LSB value.

The step that the MSB value of the POC value is mapped to the parameter(s) for MSB used in the execution of the POC alignment operation may be implemented by one of the methods as follows.

1, The MSB value is carried in the bitstream as the parameter(s) for MSB. For example, the MSB value is directly set as identification information used for identifying that the MSB value is 0, and the identification information is carried in slice header of an EL picture; or, the MSB value is set to be a multiple value, with respect to one of a minimum allowable positive integer value of MSB of the POC value of the current picture and a value obtained by adding 1 to a maximum allowable value of LSB of the POC value of the current picture, and carried in slice header of the EL picture; or, a right shifting operation is executed on the binary representation of the MSB value, and the shifted MSB value is carried in slice header of the EL picture, wherein a number of right-shifted bits is equal to length of bits for representing LSB used by the EL.

2, The MSB value is mapped to first indication information used for indicating an MSB value used by the EL in a POC alignment process. The first indication information is carried in slice header of the EL picture.

3, The MSB value is mapped to second indication information set used for indicating an acquisition mode of the parameter(s) for MSB.

In this method, when the MSB value is equal to 0, the second indication information set is determined by the following methods: indication information, used for indicating that the MSB value is zeroed, is set in the second indication information set, and the indication information is carried in slice header of the EL picture.

In this method, when the MSB value is not equal to 0, the second indication information set is determined by one of the following methods:

indication information, used for indicating that the MSB value is not zeroed, is set in the second indication information set, and the indication information is carried in slice header of the EL picture;

the POC value of the decoded picture of the BL is selected, the low bits of the binary representation of the POC is zeroed, and the POC value after zeroing operation is taken as a candidate MSB value, wherein a number of the zeroed low bits is equal to length of bits for representing LSB used by the EL; when the MSB value is equal to the candidate MSB value, indication information, used for indicating that the MSB value is directly set as the candidate MSB value derived according to the BL information, is set in the second indication information set, and the indication information is carried in slice header of the EL picture; otherwise, indication information, used for indicating that the MSB value is not directly set as the candidate MSB value derived according to the BL information, is set in the second indication information set, a difference between the MSB value and the candidate MSB value is calculated, and the indication information and the difference is carried in slice header of the EL picture.

S306: The parameters for MSB and LSB are written into a bitstream.

In this embodiment, before Step S302, it may be determined that it is needed to execute the POC alignment operation in the case of satisfying one of the following conditions that:

1, a BL picture is an Instantaneous Decoding Refresh (IDR) picture, and an EL picture rather than an IDR picture exists in an AU where the IDR picture is located;

2, a BL picture is a Broken Link Access (BLA) picture, and an EL picture rather than a BLA picture exists in an AU where the BLA picture is located;

3, an IDR or BLA BL picture exists in one or more AUs prior to a current AU in decoding order, and an EL picture is not contained in the one or more AUs;

4, an EL picture is an IDR picture, a BL picture rather than an IDR picture exists in an AU where the IDR picture is located, or a BL picture does not exist in an AU where the EL picture is located; and 5, an EL picture is a BLA picture, a BL picture rather than a BLA picture exists in an AU where the BLA picture is located, or a BL picture does not exist in the AU where the BLA picture is located.

In this embodiment, before the POC value of the current picture used during the execution of the POC alignment operation is acquired, it may be determined whether it is needed to execute the POC alignment operation according to a predictive structure and/or an error resiliency demand. In this embodiment, length of bits for representing the parameter(s) for MSB may be carried in the bitstream.

Figure 4:
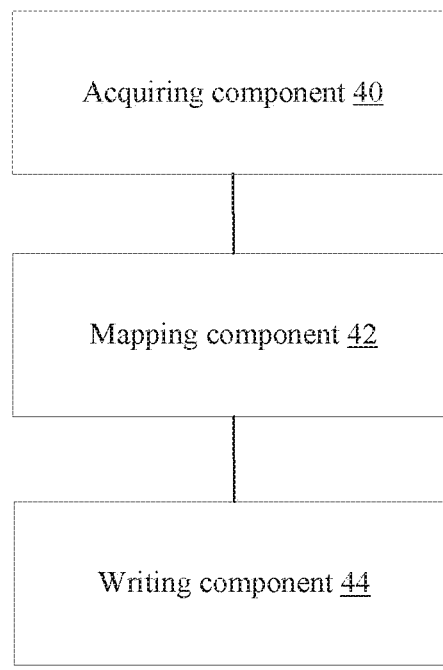
FIG. 4 is a structure block diagram of a device for coding a POC according to an embodiment of the present disclosure.

In an embodiment of the present disclosure, a device for coding POC is further provided. The device is configured to implement the above embodiment and an example implementation. Those which have been illustrated will not be elaborated herein. Components involved in the device are illustrated below. Just as a term 'component' used below, the combination of software and/or hardware with predetermined functions may be implemented. Although the device described by the following embodiment is better implemented by software, the implementation of hardware or the combination of software and hardware may be possible and conceived. FIG. 4 is a structure block diagram of a device for coding a POC according to an embodiment of the present disclosure. As shown in FIG. 4, the device includes:

an acquiring component 40, configured to acquire a POC value of a current picture used in the execution of a POC alignment operation;

a mapping component 42, connected to the acquiring component 40, and configured to map an MSB value and an LSB value of the POC value to parameters for MSB and LSB used in the execution of the POC alignment operation; and a writing component 44, connected to the mapping component 42, and configured to write the parameters for MSB and LSB into a bitstream.

Optionally, the acquiring component 40 is configured to: set, when a BL picture located in the same AU together with a current EL picture exists, the POC value as a POC value of the BL picture; otherwise, determine a POC value which shall be used by the BL picture if the AU contains the BL picture according to frame rate information of a BL and POC information of coded BL picture(s), and take the POC value which shall be used by the BL picture as the POC value.

In the embodiment, electronic equipment is further provided, which includes: the decoding device according to any one of the above descriptions and/or the coding device according to any one of the above descriptions.

The method in the embodiment of the present disclosure may comprise that: a coder judges whether it is needed to use a POC alignment operation; when it is needed to use the operation, the coder obtains an MSB value and an LSB value for POC alignment from an EL and/or a corresponding BL; the coder sets syntax element values associated with the MSB value and the LSB value, and writes the syntax element values into a bitstream; when using the POC alignment operation, a decoder acquires information for derivation of the MSB value and the LSB value from the bitstream; and the decoder obtains the MSB value and the LSB value for POC alignment from the EL and/or the corresponding BL, and calculates a POC value of a current picture.

In order to better understand the processes for coding and decoding the POC, detailed illustrations will be carried out below together with an example embodiment.

Figure 5:
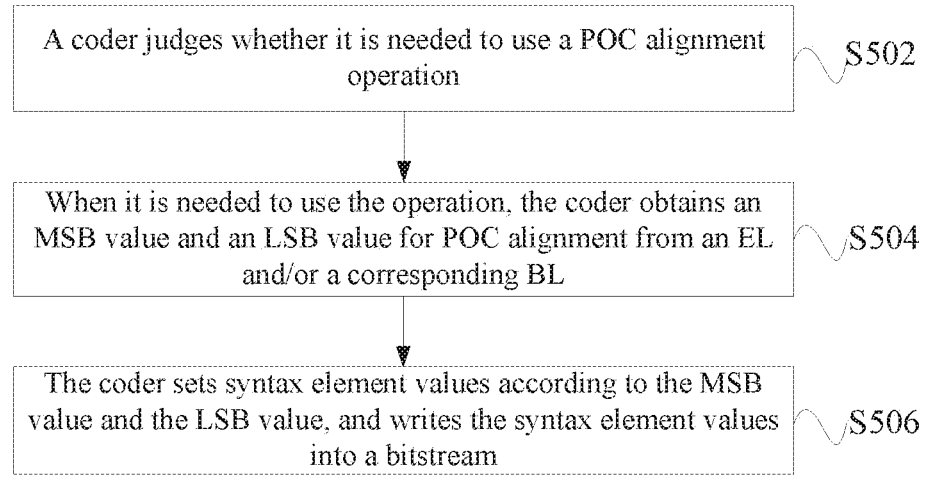
FIG. 5 is a flowchart of a method for coding a POC according to an example embodiment of the present disclosure.

A main design idea of a POC coding process in the following example embodiment may be embodied by the steps shown in FIG. 5. As shown in FIG. 5, S502: a coder judges whether it is needed to use a POC alignment operation;

S504: when it is needed to use the operation, the coder obtains an MSB value and an LSB value for POC alignment from an EL and/or a corresponding BL; and S506: the coder sets syntax element values associated with the MSB value and the LSB value, and writes the syntax element values into a bitstream.

Figure 6:
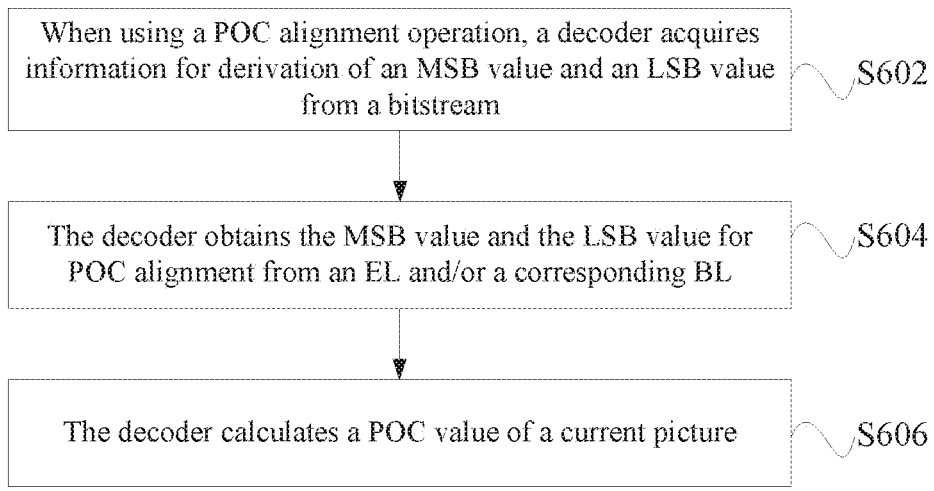
FIG. 6 is a flowchart of a method for decoding a POC according to an example embodiment of the present disclosure.

A main design idea of a POC decoding process may be embodied by the steps shown in FIG. 6.

S602: When using a POC alignment operation, a decoder acquires information for derivation of an MSB value and an LSB value from a bitstream.

S604: The decoder obtains the MSB value and the LSB value for POC alignment from an EL and/or a corresponding BL.

S606: The decoder calculates a POC value of a current picture.

Embodiment 1

Figure 7:
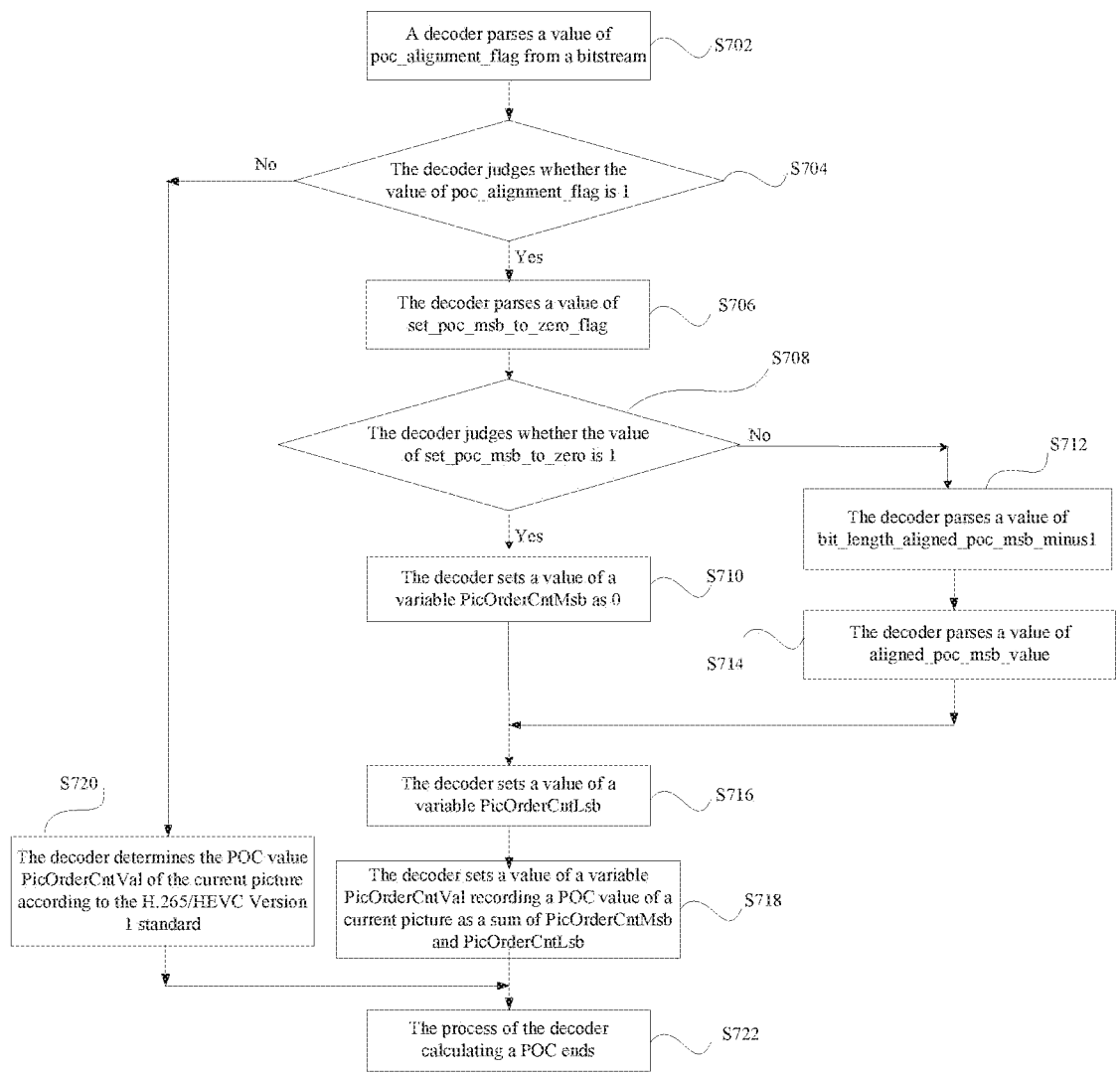
FIG. 7 is a decoding flowchart according to an example embodiment 1 of the present disclosure.

FIG. 7 is a decoding flowchart according to an example embodiment 1 of the present disclosure. As shown in FIG. 7, the flow includes the steps as follows.

Step S702: A decoder parses a value of poc_alignment_flag from a bitstream.

The decoder parses a bit field corresponding to poc_alignment_flag from the bitstream by a decoding method corresponding to u(1) to obtain the value of poc_alignment_flag.

Step S704: The decoder judges whether the value of poc_alignment_flag is 1. when a judgment result is that the value of poc_alignment_flag is 1, S706 is executed, and when the judgment result is that the value of poc_alignment_flag is not 1, Step S720 is executed.

Step S706: The decoder parses a value of set_poc_msb_to_zero_flag.

The decoder parses a bit field corresponding to set_poc_msb_to_zero_flag from the bitstream by the decoding method corresponding to u(1) to obtain the value of set_poc_msb_to_zero_flag.

Step S708: The decoder judges whether the value of set_poc_msb_to_zero is 1. when a judgment result is that the value of set_poc_msb_to_zero is 1, S710 is executed, and when the judgment result is that the value of set_poc_msb_to_zero is not 1, Step S712 is executed.

Step S710: The decoder sets a value of a variable PicOrderCntMsb to be 0, and Step S716 is executed.

Step S712: The decoder parses a value of bit_length_aligned_poc_msb_minus1.

The decoder parses a bit field corresponding to bit_length_aligned_poc_msb_minus1 from the bitstream by a decoding method corresponding to ue(v) to obtain the value of bit_length_aligned_poc_msb_minus1.

Step S714: The decoder parses a value of aligned_poc_msb_value.

The decoder parses a bit field corresponding to aligned_poc_msb_value from the bitstream by a decoding method corresponding to u(v) to obtain the value of aligned_poc_msb_value.

The decoder sets the value of the variable PicOrderCntMsb to be a value of (aligned_poc_msb_value<<(log2_max_pic_order_cnt_lsb_minus4+4)), wherein an operator '<<' is an operator defined in an H.265/HEVC Version 1 standard and configured to perform left shifting operation on binary data, and 0 is supplemented to a low bit after the left shifting operation; and log2_max_pic_order_cnt_lsb_minus4 is a bit field in an SPS, which is an SPS used by an EL.

Alternatively, the decoder sets the value of the variable PicOrderCntMsb to be a product obtained by multiplying the value of aligned_poc_msb_value by a value of a variable MaxPicOrderCntLsb, wherein the value of the variable MaxPicOrderCntLsb is calculated according to log2_max_pic_order_cnt_lsb_minus4 by a method provided in the H.265/HEVC Version 1 standard. The value is equal to a minimum allowable positive integer value of MSB value of a POC or equal to a value obtained by adding 1 to a maximum allowable value of LSB value of the POC.

Step S716: The decoder sets a value of a variable PicOrderCntLsb.

The decoder parses a value of slice_pic_order_cnt_lsb.

When the value of poc_alignment_flag is 1, the decoder sets the value of the variable PicOrderCntLsb to be the value of slice_pic_order_cnt_lsb.

Step S718: When the value of poc_alignment_flag is 1, the decoder sets a value of a variable PicOrderCntVal recording a POC value of a current picture to be a sum of PicOrderCntMsb and PicOrderCntLsb, and Step S722 is executed.

Step S720: The decoder determines the POC value PicOrderCntVal of the current picture by the H.265/HEVC Version 1 standard, and Step S722 is executed.

Step S722: The decoder ends a POC calculation process.

It is important to note that in the example embodiment, as shown in Table 1, the bitstream contains: information identifying whether to use a POC alignment operation; and information, identifying an MSB acquisition method in a POC alignment operation process and including: information identifying whether to set an MSB value of a POC to be 0, information identifying a bit length of MSB information of the POC in the bitstream, and information identifying the MSB value in a POC alignment operation.

The corresponding bitstream carries the following bit fields: a bit field identifying whether to use the POC alignment operation; and a bit field, identifying the MSB acquisition method in the POC alignment operation process and including: a bit field identifying whether to set the MSB value of the POC to be 0, a bit field identifying the bit length of the MSB information of the POC in the bitstream, and a bit field identifying the MSB value in the POC alignment operation.

TABLE 1

| | Descriptor |
|---|---|
| ... ... | |
| if (nuh_layer_id>0) { | |
|     poc_alignment_flag | u(1) |
|     if (poc_alignment_flag) { | |
|         set_poc_msb_to_zero_flag | u(1) |
|         if (! set_poc_msb_to_zero_flag) { | |
|             bit_length_aligned_poc_msb_minus1 | ue(v) |
|             aligned_poc_msb_value | u(v) |
|         } | |
|     } | |
| } | |
|     if ((nuh layer id>0 | |
| &&!poc_lsb_not_present_flag[nuh_layer_id]) \|\| | |
|             (nal_unit_type !=IDR_W_RADL | |
| && nal_unit_type !=IDR_N_LP)) { | |
|         slice_pic_order_cnt_lsb | u(v) |
| ... ... | |

Semantics (corresponding decoder operations) of each field in Table 1 are as follows. Wherein, a slice_pic_order_cnt_lsb field is an existing bit field in a related method.

poc_alignment_flag equal to 1 specifies that the POC alignment operation may be performed in a decoding process. Otherwise, poc_alignment_flag equal to 0 specifies that the POC alignment operation may or may not be performed in the decoding process. When not presented, the value of poc_alignment_flag is inferred to be 0. This element is coded and decoded by coding and decoding methods corresponding to u(1).

set_poc_msb_to_zero_flag equal to 1 specifies that a value of PicOrderCntMsb is set to be 0 in a process of calculating a POC of a current picture. Otherwise, set_poc_msb_to_zero_flag equal to 1 specifies that the value of PicOrderCntMsb is set to be aligned_poc_msb_value in the process of calculating the POC of the current picture. This element is coded and decoded by the coding and decoding methods corresponding to u(1).

bit_length_aligned_poc_msb_minus1 plus 1 specifies the number of bits for representing aligned_poc_msb_value in the bitstream. This element is coded and decoded by coding and decoding methods corresponding to ue(v).

aligned_poc_msb_value specifies a value of PicOrderCntMsb when set_poc_msb_to_zero_flag is equal to 0. This element is coded and decoded by coding and decoding methods corresponding to u(v). The number of bits for representing aligned_poc_msb_value is equal to (bit_length_aligned_poc_msb_minus1+1).

Figure 8:
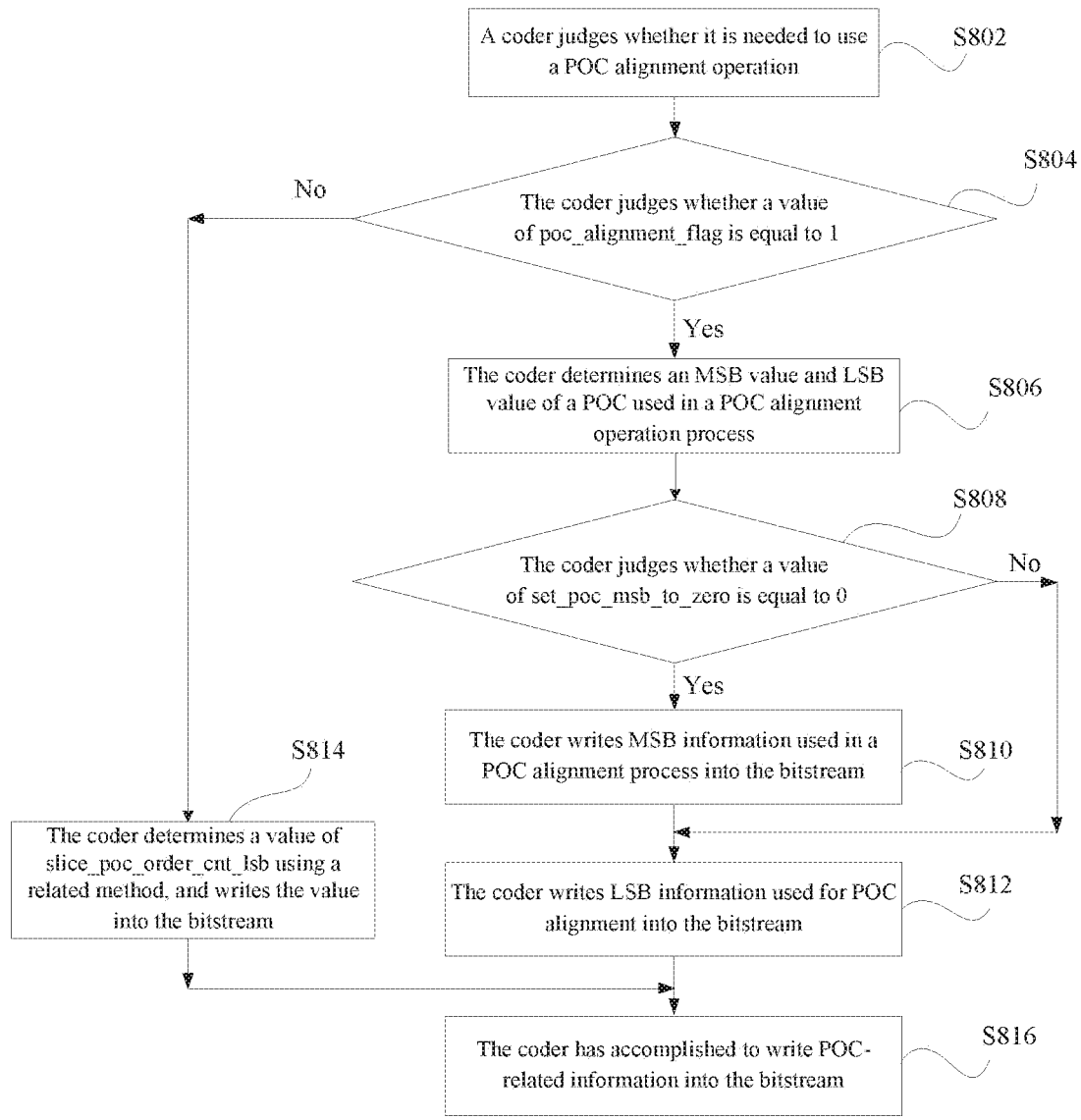
FIG. 8 is a coding flowchart according to an example embodiment 1 of the present disclosure.

FIG. 8 is a coding flowchart according to an example embodiment 1 of the present disclosure. As shown in FIG. 8, the flow includes the steps as follows.

Step S802: coder judges whether it is needed to use a POC alignment operation.

The coder initializes a value of a variable poc_alignment_flag to be 0.

The coder judges, according to a multi-layer video coding structure, whether it is needed to use a POC alignment operation. When one of the following conditions is satisfied, the coder sets the value of the variable poc_alignment_flag, associated with a certain EL, to be 1.

Condition 1: A BL picture is an IDR picture, and an EL picture rather than an IDR picture exists in the same AU.

Condition 2: A BL picture is a BLA picture, and an EL picture rather than a BLA picture exists in the same AU.

Condition 3: An IDR or BLA BL picture exists in one or more previous AUs in decoding order, and EL pictures are not contained in these previous AUs.

Condition 4: An EL picture is an IDR picture, a BL picture rather than an IDR picture exists in the same AU, or a BL picture does not exist in the same AU.

Condition 5: An EL picture is a BLA picture, a BL picture rather than the BLA picture exists in the same AU, or a BL picture does not exist in the same AU.

In addition, when a coder optimization component judges that it is needed to execute the POC alignment operation, the value of poc_alignment_flag is set as 1.

The coder writes the value of poc_alignment_flag into a bitstream by a coding method corresponding to u(1).

Step S804: The coder judges whether the value of poc_alignment_flag is equal to 1. When a judgment result is that the value of poc_alignment_flag is equal to 1, Step S806 is executed, and otherwise, Step S816 is executed.

Step S806: The coder determines an MSB value and LSB value of a POC values used in a POC alignment operation process.

The coder may judge, according to the multi-layer video coding structure, whether it is needed to execute an MSB zeroing operation on the POC, and when one of the following conditions is satisfied, the coder may directly set a value of PicOrderCntMsb to be 0.

Condition 1: A BL picture is an IDR picture, and an EL picture rather than an IDR picture exists in the same AU.

Condition 2: A BL picture is a BLA picture, and an EL picture rather than a BLA picture exists in the same AU.

Condition 3: An IDR or BLA BL picture exists in one or more previous AUs in decoding order, and EL pictures are not contained in these previous AUs.

The coder executes the following operations on a picture on which a POC alignment operation is required to be performed, on an EL.

The coder determines a POC value of this AU. When a BL picture located in the same AU together with the EL picture exists, the coder sets the value of PicOrderCntMsb to be a POC value of the BL picture. Otherwise, when a BL picture located in the same AU together with the EL picture does not exist, the coder determines, if the AU contains a BL picture, a POC value which shall be used by the BL picture according to frame rate information of a BL and POC information of a previously coded BL picture, and assigns the POC value which shall be used to the variable PicOrderCntMsb.

The coder assigns a value of (PicOrderCntMsb&(MaxPicOrderCntLsb-1)) to a variable PicOrderCntLsb, wherein an operator '&' is an operator defined in an H.265/HEVC Version 1 standard, and the value of MaxPicOrderCntLsb is equal to (1<<(log2_max_pic_order_cnt_lsb_minus4+4)). Actually, the value of MaxPicOrderCntLsb is equal to a minimum allowable positive integer value of MSB of a POC or equal to a value obtained by adding 1 to a maximum LSB allowable value of LSB of the POC, wherein log2_max_pic_order_cnt_lsb_minus4 is obtained from an SPS used by the EL.

When any one of the above three conditions is satisfied, the coder determines the value of PicOrderCntMsb by the following methods.

The coder calculates a value of (PicOrderCntMsb-PicOrderCntLsb), and re-assigns the value to the variable PicOrderCntMsb.

When the value of PicOrderCntMsb is equal to 0, the coder sets a value of a variable set_poc_msb_to_zero to be 1. Otherwise, the coder sets the value of the variable set_poc_msb_to_zero to be 0.

The coder writes the value of set_poc_msb_to_zero into the bitstream by the coding method corresponding to u(1).

Step S808: The coder judges whether the value of set_poc_msb_to_zero is equal to 0. When a judgment result is that the value of set_poc_msb_to_zero is equal to 0, Step S810 is executed, and otherwise, Step S812 is executed.

Step S810: The coder writes MSB information used in a POC alignment process into the bitstream.

The coder calculates a value of (PicOrderCntMsb>>(log2_max_pic_order_cnt_lsb_minus4+4)), and re-copies the value to the variable PicOrderCntMsb, wherein log2_max_pic_order_cnt_lsb_minus4 is obtained from the SPS used by the EL.

The coder calculates a value of (Ceil(Log2(PicOrderCntMsb+1))−1), and assigns the value to a variable bit_length_aligned_poc_msb_minus1, wherein Ceil(x) and Log2(x) are mathematical operations defined in the H.265/HEVC Version 1 standard.

The coder writes the value of bit_length_aligned_poc_msb_minus1 into the bitstream by a coding method corresponding to ue(v).

The coder assigns the value of PicOrderCntMsb to a variable aligned_poc_msb_value, and writes the value of aligned_poc_msb_value into the bitstream by a coding method corresponding to u(v). The number of used coding bits is equal to (bit_length_aligned_poc_msb_minus1+1).

Step S812 is executed.

Step S812: The coder writes LSB information used for POC alignment into the bitstream.

The coder assigns a value of PicOrderCntLsb to a variable slice_poc_order_cnt_lsb, and writes the value of slice_poc_order_cnt_lsb into the bitstream by the coding method corresponding to u(v). The number of used coding bits is equal to (log2_max_pic_order_cnt_lsb_m inus4+4), wherein log2_max_pic_order_cnt_lsb_minus4 is obtained from the SPS used by the EL.

Step S816 is executed.

Step S814: The coder determines the value of slice_poc_order_cnt_lsb by a related method, and writes the value into the bitstream.

Step S816: The coder has accomplished to write POC-related information into the bitstream.

Example Embodiment 2

Figure 9:
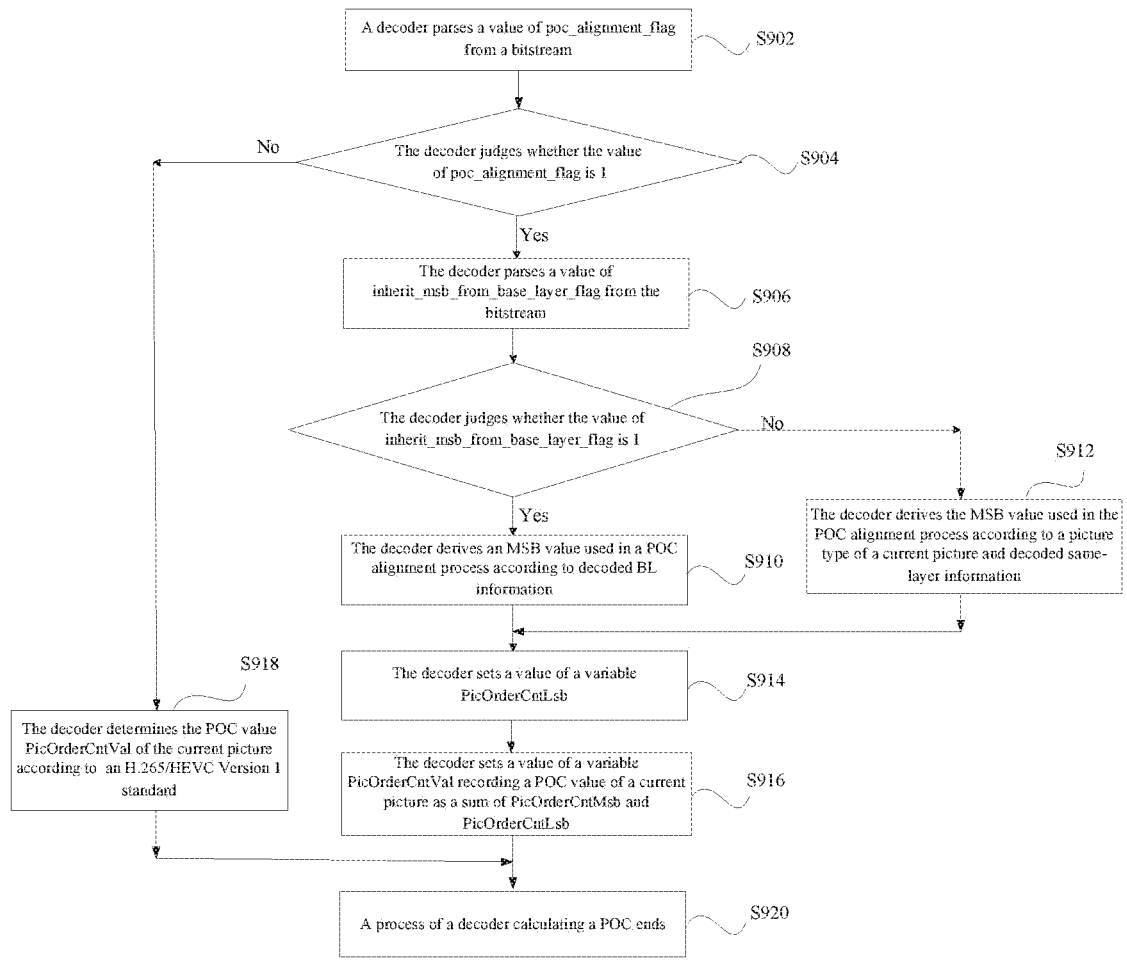
FIG. 9 is a decoding flowchart according to an example embodiment 2 of the present disclosure.

FIG. 9 is a decoding flowchart according to an example embodiment 2 of the present disclosure. As shown in FIG. 9, the flow includes the steps as follows.

Step S902: A decoder parses a value of poc_alignment_flag from a bitstream.

The decoder parses a bit field corresponding to poc_alignment_flag from the bitstream by a decoding method corresponding to u(1) to obtain the value of poc_alignment_flag.

Step S904: The decoder judges whether the value of poc_alignment_flag is 1. When a judgment result is that the value of poc_alignment_flag is 1, S906 is executed, and otherwise, Step S918 is executed.

Step S906: The decoder parses a value of inherit_msb_from_base_layer_flag from the bitstream.

The decoder parses a bit field corresponding to inherit_msb_from_base_layer_flag from the bitstream by the decoding method corresponding to u(1) to obtain the value of inherit_msb_from_base_layer_flag.

Step S908: The decoder judges whether the value of inherit_msb_from_base_layer_flag is 1. When a judgment result is that the value of inherit_msb_from_base_layer_flag is 1, S910 is executed, and otherwise, Step S912 is executed.

Step S910: The decoder derives an MSB value used in a POC alignment process according to decoded BL information.

The decoder searches a decoded BL picture for a picture (TemporalId=0) rather than a Random Access Decodable Leading (RADL) picture or a Random Access Skipped Leading (RASL) picture or a temporal domain sub-layer non-reference picture in a decoding order, and assigns a POC value of the picture to a variable PicOrderCntMsb.

The decoder calculates a value of (PicOrderCntMsb-(PicOrderCntMsb&(MaxPicOrderCntLsb-1))), and re-assigns the value to the variable PicOrderCntMsb, wherein an operator '&' is an operator defined in an H.265/HEVC Version 1 standard, and a value of MaxPicOrderCntLsb is equal to (1<<(log2_max_pic_order_cnt_lsb_m inus4+4)). Actually, the value of MaxPicOrderCntLsb is equal to a minimum allowable positive integer value of MSB of a POC or equal to a value obtained by adding 1 to a maximum allowable value of LSB of the POC, wherein log2_max_pic_order_cnt_lsb_minus4 is obtained from an SPS used by an EL.

The decoder calculates a value of ((PicOrderCntMsb>>(log2_max_pic_order_cnt_lsb_m inus4+4))<<(log2_max_pic_order_cnt_lsb_minus4+4)), and re-assigns the value to the variable PicOrderCntMsb, wherein log2_max_pic_order_cnt_lsb_minus4 is obtained from the SPS used by the EL, and operators '>>' and '<<' are bit shifting operators defined in the H.265/HEVC Version 1 standard.

Step S914 is executed.

Step S912: The decoder derives the MSB value used in the POC alignment process according to a picture type of a current picture and available decoding information of the same layer as the picture. Step S914 is executed. Step S912 may include the processing steps as follows.

Step S912-1: The decoder judges whether the following conditions are satisfied simultaneously.

Condition 1: A picture type of a current EL picture is an IDR picture or a BLA picture or a CRA picture.

Condition 2: A value of a flag bit variable NoRaslOutputFlag maintained by a current decoder is equal to 1.

When both of the above conditions are satisfied simultaneously, the decoder executes Step S912-2, and otherwise, the decoder executes Step S912-4.

Step S912-2: The decoder searches a decoded picture in the same layer for a latest picture (TemporalId=0) rather than an RADL picture or an RASL picture or a temporal domain sub-layer non-reference picture in decoding order, and assigns a POC value of the picture to the variable PicOrderCntMsb.

Step S912-3: The decoder calculates a value of (PicOrderCntMsb-(PicOrderCntMsb&(MaxPicOrderCntLsb-1))), and re-assigns the value to the variable PicOrderCntMsb, wherein an operator '&' is an operator defined in the H.265/HEVC Version 1 standard, and a value of MaxPicOrderCntLsb is equal to (1<<(log2_max_pic_order_cnt_lsb_m inus4+4)). Actually, the value of MaxPicOrderCntLsb is equal to a minimum allowable positive integer value of MSB of a POC or equal to a value obtained by adding 1 to a maximum allowable value of LSB of the POC, wherein log2_max_pic_order_cnt_lsb_minus4 is obtained from the SPS used by the EL.

Step S912-4: When not both of the judgment conditions in Step S912-1 are satisfied, and a current EL picture is a common inter-frame predicted coding picture or a CRA picture, but a value of corresponding NoRaslOutputFlag is equal to 0, the decoder executes the following operations.

The decoder sets the value of PicOrderCntMsb as 0.

Step S914: The decoder sets a value of a variable PicOrderCntLsb.

The decoder parses the bit field of slice_pic_order_cnt_lsb.

When the value of poc_alignment_flag is equal to 1, the decoder sets the value of the variable PicOrderCntLsb to be the value of slice_pic_order_cnt_lsb.

Step S916: When the value of poc_alignment_flag is equal to 1, the decoder sets a value of a variable PicOrderCntVal recording a POC value of a current picture to be a sum of PicOrderCntMsb and PicOrderCntLsb, and Step S920 is executed.

Step S918: The decoder determines the POC value PicOrderCntVal of the current picture by the H.265/HEVC Version 1 standard, and Step S920 is executed.

Step S920: The decoder ends a POC calculation process.

In the example embodiment, as shown in Table 2, the bitstream contains: information identifying whether to use a POC alignment operation; and information identifying an MSB acquisition mode in a POC alignment operation process. The corresponding bitstream carries the following bit fields: a bit field identifying whether to use the POC alignment operation; and a bit field identifying the MSB acquisition method in the POC alignment operation process.

TABLE 2

| | Descriptor |
|---|---|
| ... ... | |
| if (nuh_layer_id>0) { | |
|     poc_alignment_flag | u(1) |
|     if (poc_alignment_flag) | |
|         inherit_msb_from_base_layer_flag | u(1) |
| } | |
|     if ((nuh_layer_id>0 | |
| &&!poc_lsb_not_present_flag[nuh_layer_id]) \|\| | |
|         (nal_unit_type !=IDR_W_RADL && | |
| nal_unit_type !=IDR_N_LP)) { | |
|         slice_pic_order_cnt_lsb | u(v) |
| ... ... | |

Semantics (corresponding decoder operations) of each field in Table 2 are as follows. Wherein, a slice_pic_order_cnt_lsb field is an existing bit field in a related method.

poc_alignment_flag equal to 1 specifies that the POC alignment operation may be performed in a decoding process. Otherwise, poc_alignment_flag equal to 0 specifies that the POC alignment operation may or may not be performed in the decoding process. When not presented, the value of poc_alignment_flag is inferred to be 0. This element is coded and decoded by coding and decoding methods corresponding to u(1).

inherit_msb_from_base_layer_flag equal to 1 specifies that an MSB value used in the POC alignment process is derived according to BL decoded information in the decoding process. Otherwise, inherit_msb_from_base_layer_flag equal to 0 specifies that an MSB value used in the POC alignment process is not derived according to BL decoded information in the decoding process. This element is coded and decoded by the coding and decoding methods corresponding to u(1). It is important to note that inherit_msb_from_base_layer_flag is equivalent to 'first indication information' in the above embodiment.

Figure 10:
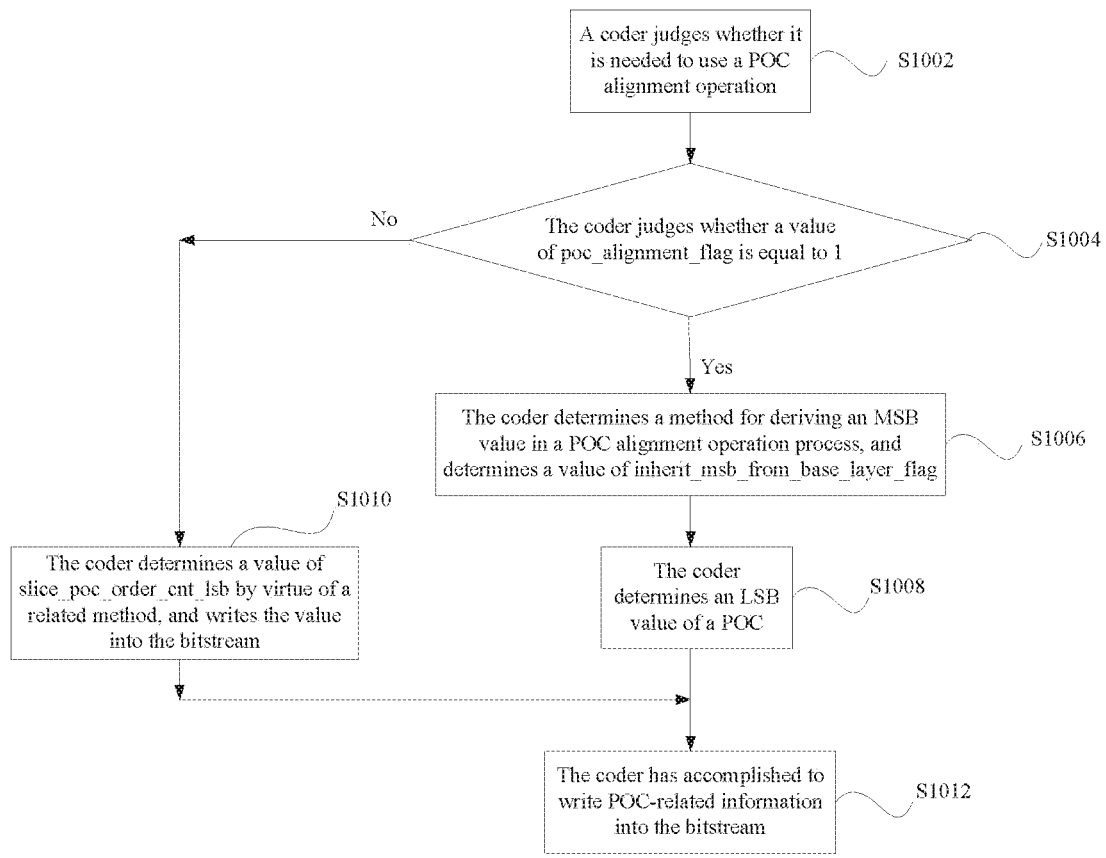
FIG. 10 is a coding flowchart according to an example embodiment 2 of the present disclosure.

FIG. 10 is a coding flowchart according to an example embodiment 2 of the present disclosure. As shown in FIG. 10, the flow includes the steps as follows.

Step S1002 is identical to Step S802.

Step S1004: A coder judges whether a value of poc_alignment_flag is equal to 1. When a judgment result is that the value of poc_alignment_flag is equal to 1, Step S1006 is executed, and otherwise, Step S1010 is executed.

Step S1006: The coder determines a method for deriving an MSB value in a POC alignment operation process, and determines a value of inherit_msb_from_base_layer_flag.

Simply, when a BL picture located in the same AU together with a current EL picture exists, the coder sets the value of inherit_msb_from_base_layer_flag to be 1. Otherwise, the coder sets the value of inherit_msb_from_base_layer_flag to be 0.

Alternatively, in order to improve the performances of the coder, an optimization component of the coder may determine the value of inherit_msb_from_base_layer_flag according to factors such as a coding structure between a BL and an EL, frame rates of different layers, error resiliency performance optimization and random access.

The coder writes the value of inherit_msb_from_base_layer_flag into a bitstream by a coding method corresponding to u(1).

Step S1008: The coder determines an LSB value of a POC.

The coder executes the following operations on a picture on which a POC alignment operation is required to be performed, on the EL.

The coder determines a POC value of the AU. When a BL picture located in the same AU together with the EL picture exists, the coder sets a value of PicOrderCntVal to be a POC value of the BL picture. Otherwise, when a BL picture located in the same AU together with the EL picture does not exist, the coder determines, if the AU contains a BL picture, a POC value which shall be used by the BL picture according to frame rate information of the BL and POC information of a previously coded BL picture, and assigns the value to the variable PicOrderCntVal.

The coder assigns a value of (PicOrderCntVal&(MaxPicOrderCntLsb-1)) to a variable PicOrderCntLsb, wherein an operator '&' is an operator defined in an H.265/HEVC Version 1 standard, and a value of MaxPicOrderCntLsb is equal to (1<<(log2_max_pic_order_cnt_lsb_m inus4+4)). Actually, the value of MaxPicOrderCntLsb is equal to a minimum allowable positive integer value of MSB of a POC or equal to a value obtained by adding 1 to a maximum allowable value of LSB of the POC, wherein log2_max_pic_order_cnt_lsb_minus4 is obtained from an SPS used by the EL.

The coder assigns the value of PicOrderCntLsb to a variable slice_poc_order_cnt_lsb, and writes the value of slice_poc_order_cnt_lsb into the bitstream by a coding method corresponding to u(v). The number of used coding bits is equal to (log2_max_pic_order_cnt_lsb_m inus4+4). log2_max_pic_order_cnt_lsb_minus4 is obtained from the SPS used by the EL.

Step S1010: The coder determines the value of slice_poc_order_cnt_lsb by a related method, and writes the value into the bitstream. Step S1012 is executed.

Step S1012: The coder has accomplished to write POC-related information into the bitstream.

Embodiment 3

Figure 11:
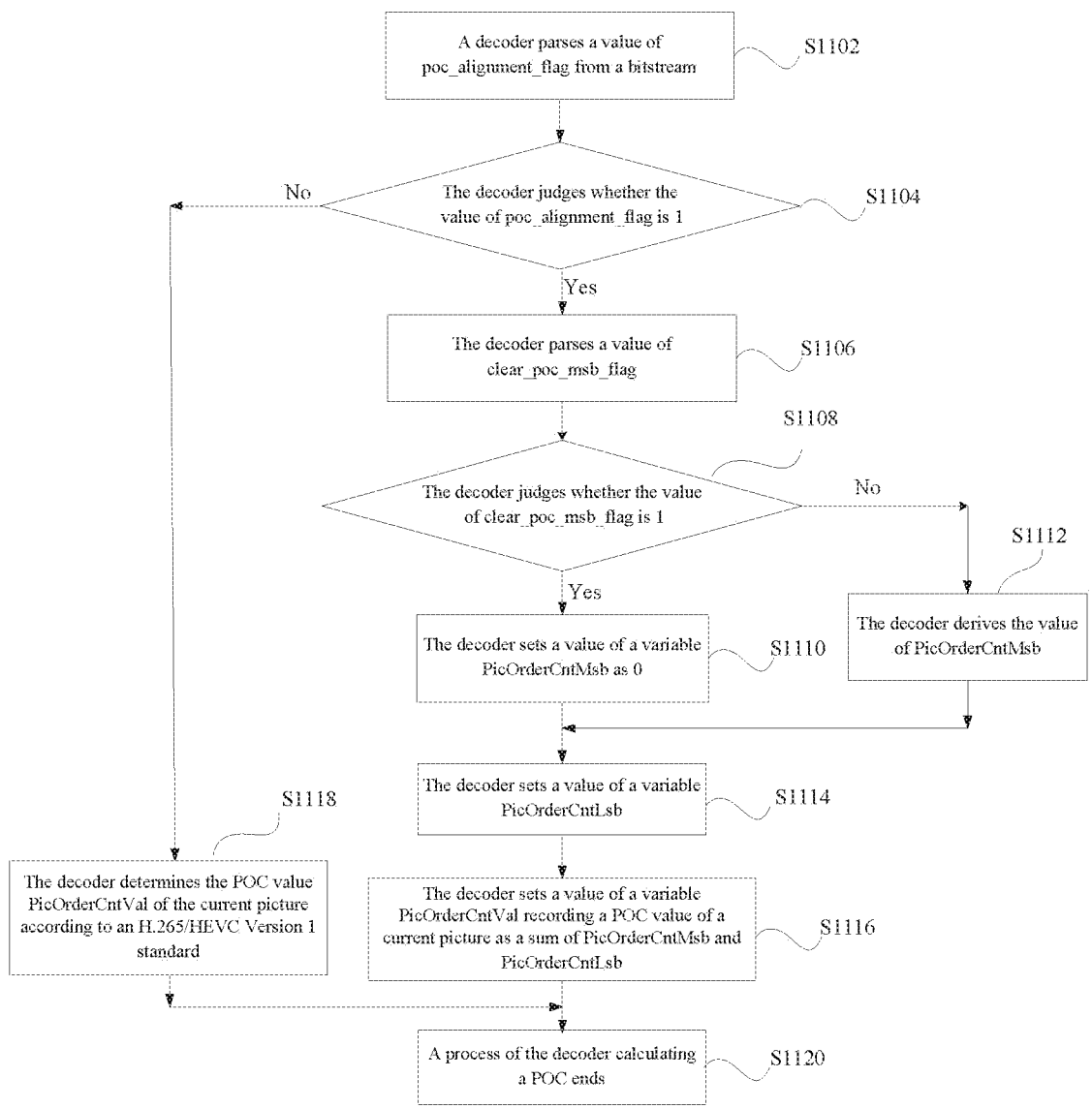
FIG. 11 is a decoding flowchart according to an example embodiment 3 of the present disclosure.

FIG. 11 is a decoding flowchart according to an example embodiment 3 of the present disclosure. As shown in FIG. 11, the flow includes the steps as follows.

Step S1102: A decoder parses a value of poc_alignment_flag from a bitstream.

The decoder parses a bit field corresponding to poc_alignment_flag from the bitstream by a decoding method corresponding to u(1) to obtain the value of poc_alignment_flag.

Step S1104: The decoder judges whether the value of poc_alignment_flag is 1. When a judgment result is that the value of poc_alignment_flag is 1, S1106 is executed, and otherwise, Step S1120 is executed.

Step S1106: The decoder parses a value of clear_poc_msb_flag.

The decoder parses a bit field corresponding to clear_poc_msb_flag from the bitstream by the decoding method corresponding to u(1) to obtain the value of clear_poc_msb_flag.

Step S1108: The decoder judges whether the value of clear_poc_msb_flag is 1. When a judgment result is that the value of clear_poc_msb_flag is 1, S1110 is executed, and otherwise, S1112 is executed.

Step S1110: The decoder sets a value of a variable PicOrderCntMsb to be 0. Step S1116 is executed.

Step S1112: The decoder derives the value of PicOrderCntMsb. Step S1116 is executed. The step S1112 may include the processing steps as follows.

Step S1112-1: The decoder parses a value of inherit_msb_from_base_layer_flag. The decoder parses a bit field corresponding to inherit_msb_from_base_layer_flag from the bitstream by the decoding method corresponding to u(1) to obtain the value of inherit_msb_from_base_layer_flag.

Step S1112-2: The decoder judges whether the value of inherit_msb_from_base_layer_flag is 1. When a judgment result is that the value of inherit_msb_from_base_layer_flag is 1, S1118 is executed, and otherwise, Step S1112-5 is executed.

Step S1112-3: The decoder parses a value of poc_msb_diff_from_base_layer.

The decoder parses a bit field corresponding to poc_msb_diff_from_base_layer from the bitstream by a decoding method corresponding to se(v) to obtain the value of poc_msb_diff_from_base_layer.

Step S1112-4: The decoder derives the value of PicOrderCntMsb by BL information. Step S1112-6 is executed.

The decoder searches a decoded BL picture for a latest picture (TemporalId=0) rather than an RADL picture or an RASL picture or a temporal domain sub-layer non-reference picture in a decoding order, and assigns a POC value of the picture to a variable BaseLayerPicOrderCnt.

The decoder calculates a value of (BaseLayerPicOrderCnt-(BaseLayerPicOrderCnt&(MaxPicOrderCntLsb-1))), and re-assigns the value to the variable BaseLayerPicOrderCnt, wherein an operator '&' is an operator defined in an H.265/HEVC Version 1 standard, and a value of MaxPicOrderCntLsb is equal to (1<<(log2_max_pic_order_cnt_lsb_minus4+4)). Actually, the value of MaxPicOrderCntLsb is equal to a minimum allowable positive integer value of MSB of a POC or equal to a value obtained by adding 1 to a maximum allowable value of LSB of the POC, wherein log2_max_pic_order_cnt_lsb_minus4 is obtained from an SPS used by a BL.

The decoder calculates a value of ((poc_msb_diff_from_base_layer+(BaseLayerPicOrderCntMsb>>(log2_max_pic_order_cnt_lsb_minus4+4)))<<(log2_max_pic_order_cnt_lsb_m inus4+4)), and assigns the value to the variable PicOrderCntMsb, wherein log2_max_pic_order_cnt_lsb_minus4 is obtained from an SPS used by an EL, and operators '>>' and '<<' are bit right shifting and left shifting operators defined in the H.265/HEVC Version 1 standard separately.

Step S1112-5: The decoder derives the value of PicOrderCntMsb by EL information. Step S1112-6 is executed.

The decoder searches a decoded picture in the same layer for a latest picture (TemporalId=0) rather than an RADL picture or an RASL picture or a temporal domain sub-layer non-reference picture in a decoding order, and assigns a POC value of the picture to the variable PicOrderCntMsb.

Step S1112-6: The decoder ends a PicOrderCntMsb value derivation process.

Step S1114: The decoder sets a value of a variable PicOrderCntLsb.

The decoder parses the bit field of slice_pic_order_cnt_lsb.

When the value of poc_alignment_flag is equal to 1, the decoder sets the value of the variable PicOrderCntLsb to be the value of slice_pic_order_cnt_lsb.

Step S1116: When the value of poc_alignment_flag is equal to 1, the decoder sets a value of a variable PicOrderCntVal recording a POC value of a current picture to be a sum of PicOrderCntMsb and PicOrderCntLsb, and Step S1132 is executed.

Step S1118: The decoder determines the POC value PicOrderCntVal of the current picture by the H.265/HEVC Version 1 standard, and Step S1120 is executed.

Step S1120: The decoder ends a POC calculation process.

In the example embodiment, as shown in Table 3, the bitstream contains: information identifying whether to use a POC alignment operation; and information identifying an MSB acquisition mode in a POC alignment operation process. The corresponding bitstream carries the following bit fields: a bit field identifying whether to use the POC alignment operation; and a bit field identifying the MSB acquisition method in the POC alignment operation process.

TABLE 3

| | Descriptor |
|---|---|
| ... ... | |
| if (nuh_layer_id>0) { | |
|    poc_alignment_flag | u(1) |
|    if (poc_alignment_flag) { | |
|       clear_poc_msb_flag | |
|       if (clear_poc_msb_flag) { | |
|          inherit_msb_from_base_layer_flag | u(1) |
|          if (! inherit_msb_from_base_layer_flag) | |
|             poc_msb_diff_from_base_layer | se(v) |
|       } | |
|    } | |
| } | |
|    if ((nuh_layer_id>0 | |
| &&!poc_lsb_not_present_flag[nuh_layer_id]) \|\| | |
|          (nal_unit_type !=IDR_W_RADL | |

TABLE 3-continued

| | Descriptor |
|---|---|
| && nal_unit_type !=IDR_N_LP)) {  slice_pic_order_cnt_lsb | u(v) |
| ... ... | |

Semantics (corresponding decoder operations) of each field in Table 3 are as follows. Wherein, a slice_pic_order_cnt_lsb field is an existing bit field in a related method.

poc_alignment_flag equal to 1 specifies that the POC alignment operation may be performed in a decoding process. Otherwise, poc_alignment_flag equal to 0 specifies that the POC alignment operation may or may not be performed in the decoding process. When not presented, the value of poc_alignment_flag is inferred to be 0. This element is coded and decoded by coding and decoding methods corresponding to u(1).

clear_poc_msb_flag equal to 1 specifies that the value of PicOrderCntMsb is set to be 0 in a process of calculating a POC of a current picture. Otherwise, clear_poc_msb_flag equal to 0 specifies that the value of PicOrderCntMsb is set to be aligned_poc_msb_value in the process of calculating the POC of the current picture. This element is coded and decoded by the coding and decoding methods corresponding to u(1). It is important to note that clear_poc_msb_flag is equivalent to 'second indication information' in the above embodiment.

inherit_msb_from_base_layer_flag equal to 1 specifies that an MSB value is derived in the POC alignment process according to available BL decoded information in the decoding process. Otherwise, inherit_msb_from_base_layer_flag equal to 0 specifies that an MSB value is not derived in the POC alignment process according to available BL decoded information in the decoding process. This element is coded and decoded by the coding and decoding methods corresponding to u(1).

poc_msb_diff_from_base_layer is used to calculate the value of PicOrderCntMsb when the POC alignment operation is used. This element is coded and decoded by coding and decoding methods corresponding to se(v).

Figure 12:
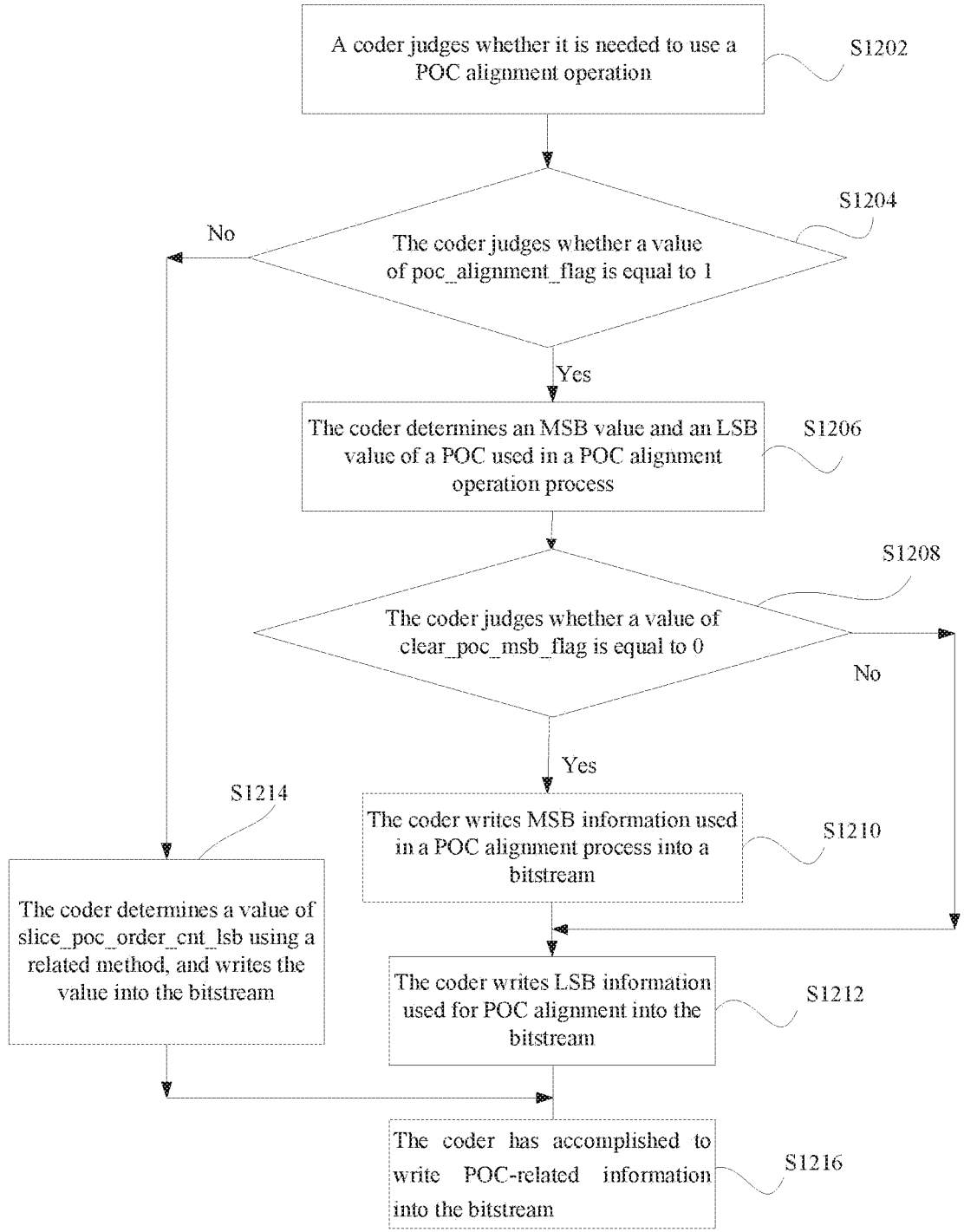
FIG. 12 is a coding flowchart according to an example embodiment 3 of the present disclosure.

FIG. 12 is a coding flowchart according to an example embodiment 3 of the present disclosure. As shown in FIG. 12, the flow includes the steps as follows.

Step S1202 is identical to Step S1002.

Step S1204: A coder judges whether a value of poc_alignment_flag is equal to 1. When a judgment result is that the value of poc_alignment_flag is equal to 1, Step S1206 is executed, and otherwise, Step S1214 is executed.

Step S1206: The coder determines an MSB value and LSB value of a POC used in a POC alignment operation process.

The coder may judge, according to a multi-layer video coding predictive structure, whether it is needed to execute an MSB zeroing operation on the POC, and when one of the following conditions is satisfied, the coder may directly set a value of PicOrderCntMsb to be 0.

Condition 1: A BL picture is an IDR picture, and an EL picture rather than an IDR picture exists in the same AU.

Condition 2: A BL picture is a BLA picture, and an EL picture rather than a BLA picture exists in the same AU.

Condition 3: An IDR or BLA BL picture exists in one or more previous AUs in decoding order, and EL pictures are not contained in these previous AUs.

The coder executes the following operations on a picture on which a POC alignment operation is needed to be performed on.

The coder determines a POC value of this AU. When a BL picture located in the same AU together with the EL picture exists, the coder sets the value of PicOrderCntMsb to be a POC value of the BL picture. Otherwise, when a BL picture located in the same AU together with the EL picture does not exist, the coder determines, if the AU contains a BL picture, a POC value which shall be used by the BL picture according to frame rate information of a BL and POC information of a previously coded BL picture, and assigns the value to the variable PicOrderCntMsb.

The coder assigns a value of (PicOrderCntMsb&(MaxPicOrderCntLsb-1)) to a variable PicOrderCntLsb, wherein an operator '&' is an operator defined in an H.265/HEVC Version 1 standard, and the value of MaxPicOrderCntLsb is equal to (1<<(log2_max_pic_order_cnt_lsb_minus4+4)). The value is equal to a minimum allowable positive integer value of MSB of a POC or equal to a value obtained by adding 1 to a maximum allowable value of LSB of the POC.

When any one of the above three conditions is satisfied, the coder determines the value of PicOrderCntMsb by the following methods.

The coder calculates a value of (PicOrderCntMsb-PicOrderCntLsb), and re-assigns the value to the variable PicOrderCntMsb.

When the value of PicOrderCntMsb is equal to 0, the coder sets a value of a variable clear_poc_msb_flag to be 1. Otherwise, the coder sets the value of the variable clear_poc_msb_flag to be 0.

The coder writes the value of clear_poc_msb_flag into the bitstream by the coding method corresponding to u(1).

Step S1208: The coder judges whether the value of clear_poc_msb_flag is equal to 0. When a judgment result is that the value of clear_poc_msb_flag is equal to 0, Step S1210 is executed, and otherwise, Step S1212 is executed.

Step S1210: The coder determines MSB information used in a POC alignment process and writes the MSB information into the bitstream. Step S1212 is executed.

The decoder searches a decoded EL picture in the same layer for a latest picture (TemporalId=0) rather than an RADL picture or an RASL picture or a temporal domain sub-layer non-reference picture in a decoding order, and assigns a POC value of the picture to a variable prevPicOrderCnt.

The decoder calculates a value of (prevPicOrderCnt>>(log2_max_pic_order_cnt_lsb_minus4+4)), and re-copies the value to a variable prevPicOrderCntMsb, wherein the value of log2_max_pic_order_cnt_lsb_minus4 is obtained from an SPS used by an EL.

When the value of prevPicOrderCntMsb is equal to the value of PicOrderCntMsb, the coder sets a value of inherit_msb_from_base_layer_flag to be 0. Otherwise, the coder sets the value of inherit_msb_from_base_layer_flag to be 1.

Alternatively, in order to improve the performances of the coder, an optimization component of the coder may determine the value of inherit_msb_from_base_layer_flag according to factors such as a predictive coding structure between a BL and the EL, frame rates of different layers, error resiliency performance optimization and random access.

The coder writes the value of inherit_msb_from_base_layer_flag into the bitstream by the coding method corresponding to u(1).

When the value of inherit_msb_from_base_layer_flag is 1, the coder determines a value of poc_msb_diff_from_base_layer by the following methods.

The decoder searches a decoded BL picture for a latest picture (TemporalId=0) rather than an RADL picture or an RASL picture or a temporal domain sub-layer non-reference picture in a decoding order, and assigns a POC value of the picture to a variable BaseLayerPicOrderCnt.

The decoder calculates a value of (BaseLayerPicOrderCnt-(BaseLayerPicOrderCnt&(MaxPicOrderCntLsb-1))), and re-assigns the value to the variable BaseLayerPicOrderCnt, wherein an operator '&' is an operator defined in an H.265/HEVC Version 1 standard, and a value of MaxPicOrderCntLsb is equal to (1<<(log2_max_pic_order_cnt_lsb_minus4+4)). The value of MaxPicOrderCntLsb is equal to a minimum allowable positive integer value of MSB of a POC or equal to a value obtained by adding 1 to a maximum allowable value of LSB of the POC, wherein log2_max_pic_order_cnt_lsb_minus4 is obtained from an SPS used by the BL.

The decoder calculates a value of ((PicOrderCntVal-(BaseLayerPicOrderCntMsb>>(log2_max_pic_order_cnt_lsb_m inus4+4)))<<(log2_max_pic_ordercnt_lsb_minus4+4)), and assigns the value to the variable poc_msb_diff_from_base_layer, wherein log2_max_pic_order_cnt_lsb_minus4 is obtained from an SPS used by the EL, and operators '>>' and '<<' are bit right shifting and left shifting operators defined in the H.265/HEVC Version 1 standard separately.

The coder writes the value of poc_msb_diff_from_base_layer into the bitstream by a coding method corresponding to se(v).

Step S1212: The coder writes LSB information used for POC alignment operation into the bitstream. Step S1216 is executed.

The coder assigns a value of PicOrderCntLsb to a variable slice_poc_order_cnt_lsb, and writes the value of slice_poc_order_cnt_lsb into the bitstream by a coding method corresponding to u(v). The number of used coding bits is equal to (log2_max_pic_order_cnt_lsb_m inus4+4), wherein log2_max_pic_order_cnt_lsb_minus4 is obtained from the SPS used by the EL.

Step S1214: The coder determines the value of slice_poc_order_cnt_lsb by a conventional method, and writes the value into the bitstream.

Step S1216: The coder has accomplished to write POC-related information into the bitstream.

The electronic equipment may process at least one of the following multi-layer video signals: a scalable video signal, a multiview video signal, a multiview video depth signal, and a multiview video and multiview depth signal, wherein a stereoscopic video is a special form of a multiview video of which a view number is equal to 2.

The electronic equipment may code the multi-layer video signals by an implementation method for a coder in the above embodiments, and output a bitstream.

The electronic equipment may parse the bitstream by an implementation method for coding and/or decoding in the above embodiments, to obtain POC information required to be used in decoding and playing processes and to recover the multi-layer video signals.

The electronic equipment in the embodiment may be a relevant bitstream generation device and a receiving playing device in a video communication application, such as a mobile phone, a computer, a server, a set-top box, a portable mobile terminal, a digital camera and a television broadcast system device.

In conclusion, the embodiments of the present disclosure achieve the beneficial effects as follows. The problems in the related art that the accuracy in decoding and outputting the multilayer video coding bitstream cannot be ensured and an extra overhead of network resources is increased in multi-layer video coding and decoding processes are solved, thereby achieving the effects that it is unnecessary to add any bit fields to a BL bitstream so as to execute a POC alignment-related operation and it is also unnecessary to execute any POC translation operation on a picture stored in a DPB of a layer.

The above is only the example embodiments of the present disclosure, and is not intended to limit the present disclosure. There may be various modifications and variations in the present disclosure for those skilled in the art. Any modifications, equivalent replacements, improvements and the like within the spirit and principle of the present disclosure shall fall within the protection scope of the present disclosure.

INDUSTRIAL APPLICABILITY

On the basis of the technical solutions provided in the embodiments of the present disclosure, parameters for MSB and LSB used in an alignment operation on a POC are acquired by parsing a multi-layer video coding bitstream, an MSB value and an LSB value of a POC value of a current picture are determined according to the parameters for MSB and LSB and the POC value of the current picture is calculated. The problems in the related art that the accuracy in decoding and outputting the multilayer video coding bitstream cannot be ensured and an extra overhead of network resources is increased in multilayer video coding and decoding processes are solved, thereby achieving the effects that it is unnecessary to add any bit fields to a BL bitstream so as to execute a POC alignment-related operation and it is also unnecessary to execute any POC translation operation on a picture stored in a DPB of a layer.

What is claimed is:

1. A method for decoding a Picture Order Count (POC) value of a picture from a bitstream, comprising:
   acquiring, by a decoder, parameters for Most Significant Bit (MSB) and Least Significant Bit (LSB), wherein the parameters for MSB and LSB are used in an alignment operation on the POC value of the picture;
   determining, by the decoder, an MSB value and an LSB value of the POC value of the picture according to the parameters for MSB and LSB; and
   calculating, by the decoder, the POC value of the picture according to the MSB value and the LSB value;
   wherein the determining, by the decoder, the MSB value of the POC value of the picture comprises:
   acquiring a first indication from the bitstream, and
   deriving the MSB value according to the first indication information to obtain the MSB value of the POC value of the current picture;
   wherein the deriving, by the decoder, the MSB value comprises:
   setting a product, obtained by multiplying a value of the parameter for MSB by a minimum allowable positive integer value of the MSB value of the POC value of the current picture.

2. The method as claimed in claim 1, wherein determining, by the decoder, the LSB value of the POC value of the picture according to the parameter for LSB comprises:
   directly acquiring, by the decoder, the parameter for LSB from a slice header.

3. The method as claimed in claim 1, further including:
acquiring, by the decoder, a POC alignment operation flag carried in a slice header, wherein when the POC alignment operation flag indicates that an alignment operation is needed to be executed, thereby triggering the acquiring the parameters for MSB and LSB.

4. The method of claim 1, wherein the bitstream comprises a base layer bitstream of a multilayer video bitstream.

5. The method of claim 1, wherein the bitstream comprises an enhancement layer bitstream of a multilayer video bitstream.

6. The method of claim 5, wherein the multilayer video bitstream corresponds represents a scalable video or a multiview video or a stereoscopic video.

7. The method of claim 1, including:
storing, by the decoder, the picture in a decoded picture buffer (DPB); and
using the POC value of the picture to output the picture to a displaying process,
wherein the POC value of the picture is calculated for the picture in the DPB without performing a translation operation or a bit-shifting operation on fields of the bitstream.

8. A device for decoding a Picture Order Count (POC) value, located in a decoder, comprising: a hardware processor coupled with a memory and configured to execute program components stored on the memory, wherein the program components comprise:
an acquiring component, configured for acquiring, by a decoder, parameters for Most Significant Bit (MSB) and Least Significant Bit (LSB), wherein the parameters for MSB and LSB are used in an alignment operation on the POC value of the picture;
a determining component, configured for determining an MSB value and an LSB value of the POC value of the picture according to the parameters for MSB and LSB;
a calculating component, configured for calculating the POC value of the picture according to the MSB value and the LSB value;
wherein the determining the MSB value of the POC value of the picture comprises:
acquiring a first indication from the bitstream, and
deriving the MSB value according to the first indication information to obtain the MSB value of the POC value of the current picture;
wherein the deriving the MSB value comprises:
setting a product, obtained by multiplying a value of the parameter for MSB by a minimum allowable positive integer value of the MSB value of the POC value of the current picture.

9. The device as claimed in claim 8, wherein determining the LSB value of the POC value of the picture according to the parameter for LSB comprises:
directly acquiring the parameter for LSB from a slice header.

10. The device as claimed in claim 8, wherein the program components further include a component configured for acquiring a POC alignment operation flag carried in a slice header, wherein when the POC alignment operation flag indicates that an alignment operation is needed to be executed, thereby triggering the acquiring the parameters for MSB and LSB.

11. The device of claim 8, wherein the bitstream comprises a base layer bitstream of a multilayer video bitstream.

12. The device of claim 8, wherein the bitstream comprises an enhancement layer bitstream of a multilayer video bitstream.

13. The device of claim 12, wherein the multilayer video bitstream corresponds represents a scalable video or a multiview video or a stereoscopic video.

14. The device of claim 8, including:
a decoded picture buffer (DPB) configured to store by the decoder, the picture; and
wherein the device is configured to use the POC value of the picture to output the picture to a displaying process,
wherein the POC value of the picture is calculated for the picture in the DPB without performing a translation operation or a bit-shifting operation on fields of the bitstream.

* * * * *